United States Patent
Giza et al.

(10) Patent No.: US 7,329,693 B2
(45) Date of Patent: Feb. 12, 2008

(54) ADHESIVE COMPOSITION AND METHOD FOR BONDING TO RUBBER

(75) Inventors: Emil Giza, Tokyo (JP); Masaaki Nakamura, Tokyo (JP); Masato Yoshikawa, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 387 days.

(21) Appl. No.: 10/478,673

(22) PCT Filed: May 22, 2002

(86) PCT No.: PCT/JP02/04953

§ 371 (c)(1),
(2), (4) Date: Nov. 24, 2003

(87) PCT Pub. No.: WO02/094962

PCT Pub. Date: Nov. 28, 2002

(65) Prior Publication Data

US 2004/0149382 A1    Aug. 5, 2004

(30) Foreign Application Priority Data

May 22, 2001 (JP) ............................. 2001-152527

(51) Int. Cl.
    *C08F 2/46* (2006.01)
(52) U.S. Cl. ...................... 522/189; 522/184; 522/150; 522/157; 522/158; 522/159; 522/161; 522/113; 522/114; 522/119; 522/120; 522/121; 522/133; 428/492; 428/500; 428/355 R; 428/355 BL
(58) Field of Classification Search .............. 522/120, 522/121, 158, 125, 159, 161, 113, 114, 119, 522/133, 150, 157, 184, 189; 428/355 R, 428/355 BL, 492, 500
See application file for complete search history.

(56) References Cited

U.S. PATENT DOCUMENTS

| | | | |
|---|---|---|---|
| 4,254,016 A | 3/1981 | Onizawa | |
| 4,600,745 A | 7/1986 | Creighton | |
| 4,786,586 A * | 11/1988 | Lee et al. ................... | 430/532 |
| 5,536,621 A * | 7/1996 | Mori et al. ............... | 430/284.1 |

FOREIGN PATENT DOCUMENTS

| | | |
|---|---|---|
| EP | 0 018 529 A | 11/1980 |
| EP | 0 389 140 A2 | 9/1990 |
| EP | 0 672 713 A1 | 9/1995 |
| GB | 2 014 173 A | 8/1979 |
| JP | 54-100448 A | 8/1979 |
| JP | 62-100536 A | 5/1987 |
| JP | 2002-37962 A | 2/2002 |
| WO | WO 92/03514 A | 3/1992 |
| WO | WO 97/35920 * | 10/1997 |

* cited by examiner

*Primary Examiner*—Sanza L. McClendon
(74) *Attorney, Agent, or Firm*—Sughrue Mion, PLLC

(57) ABSTRACT

An adhesive composition of the present invention comprises (A) a conjugated diene polymer having a weight-average molecular weight of 500 to 100,000 and (B) an electron pair-donating basic compound; or comprises (A) a conjugated diene polymer having a weight-average molecular weight of 500 to 100,000, (C) a compound having in its molecule three or more functional groups selected from the group consisting of acryloyloxy group, methacryloyloxy group and groups represented by the following formula I:

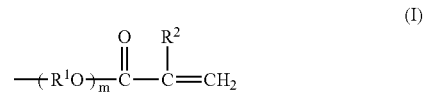

wherein $R^1$, $R^2$ and m are the same as defined in the specification, and (D) a compound having in its molecule one or two functional groups selected from the group consisting of acryloyloxy group and methacryloyloxy group. At least a part of the surface of an adherend is coated with the adhesive composition to form an adhesive layer. After optionally irradiating the adhesive layer with ultraviolet light or radiation, the vulcanization is preformed while bringing an unvulcanized rubber into press-contact with the adhesive layer, thereby attaining a strong adhesion between the rubber and the adherend. The rubber/adherend composite thus produced is suitably used for the production of rubber-reinforcing materials and rubber articles.

18 Claims, 1 Drawing Sheet

ADHESIVE COMPOSITION AND METHOD FOR BONDING TO RUBBER

TECHNICAL FIELD

The present invention relates to an adhesive composition and a bonding method using the adhesive composition, and particularly, to an adhesive composition for rubbers, a method for bonding a rubber to an adherend via the adhesive composition by vulcanizing adhesion optionally after irradiating the adhesive composition with ultraviolet light, etc., a rubber-reinforcing material produced by the bonding method, and a rubber article using the rubber-reinforcing material.

BACKGROUND ART

Generally, rubbers have a high elongation and a low elastic modulus and have been practically made into composites with other materials such as plastics to make the best use of their properties. To produce such composites advantageously, a rubber and an adherend are integrally bonded by the vulcanization of the rubber, because such a method is easily and simply applicable even when the adhesive surface is geometrically complicated. To ensure an adhesion force, there are known various methods including the surface treatment of plastic adherends, the modification of components of adhesive composition, etc.

In conventional rubber bonding methods; using an adhesive composition, there have been extensively used solvent type adhesives comprising a rubber-containing adhesive composition and a solvent such as water and an organic solvent. The solvent is used to make the adhesive composition into liquid state, thereby ensuring a void-free coating of the adhesive composition on the adherend. To enhance the resistance to cohesive failure of the adhesive composition so as to prevent the adhesive joint from being broken by a stress such as dynamic strain, the solvent is frequently removed by evaporation, etc. in the adhesion step for hardening the adhesive layer. The adhesive composition requiring the removal of the solvent upon hardening the adhesive layer fails to utilize the solvent as an effective component after the adhesive-bonding, and often necessitates a solvent treatment for environmental protection. Therefore, the use of a solvent-free adhesive composition or an adhesive composition in which the solvent is incorporated into the adhesive layer in the adhesion step for hardening the adhesive composition is desired.

There has been conventionally known a bonding method using, as the adhesive composition of the above type, an adhesive composition containing a monomer that is polymerizable by the irradiation of radiation such as ultraviolet light, visible light and electron beam or by the application of external energy such as heat. In this method, the adhesive composition is in a liquid state when applied on the surface of adherend to thereby minimize adhesive defects due to voids, and the adhesive layer with a network cross-linked structure is formed by the polymerization of monomer in the adhesive-bonding treatment. Regarding the method of bonding rubber using the adhesive composition of this type, Japanese Patent Application Laid-Open No. 55-145768 (DE 2916909C) discloses that: a coating compound comprising at least one liquid hydrocarbon polymer having a double bond and (or), if required, at least one polyamine derivative is rapidly or completely made into network structure by the irradiation of ionizing radiation such as electron beam without external heating, thereby ensuring its good adhesion to a rubber substrate. It is further described in the document that: the coating compound may be applied to a completely vulcanized molded article and then made into network structure, or alternatively may be applied on a crude mixture not yet made into network structure and then made into network structure simultaneously with the crude mixture. The document proceeds that: in the latter treatment, if the vulcanization is conducted by the irradiation of electron beam, the use of sulfur as a vulcanizing agent and (or) a vulcanization accelerator for making the crude mixture into network structure can be omitted. The proposed method relates to making the rubber component and the adhesive composition into network structure to firmly bond onto rubber, and is characterized that the use of sulfur as a vulcanizing agent and (or) a vulcanization accelerator can be omitted in making the rubber and the adhesive composition into network structure. However, as a result of the studies on the adhesive composition and the bonding method of the present invention, the inventors have found that in the case of making the adhesive composition into network structure by the optional irradiation with irradiation such as ultraviolet light, visible light and electron beam, when the heating is made while bringing an unvulcanized rubber into press-contact with the adhesive composition, sulfur migrates from the rubber into the adhesive composition, thereby achieving a strong adhesion due to the sulfur-assisted cross-linking reaction.

DISCLOSURE OF INVENTION

In view of the above circumstances; an object of the present invention is to provide a novel adhesive composition capable of creating an excellent adhesion between a rubber and an adherend simultaneously with the vulcanization of the rubber, a bonding method using the adhesive composition, a rubber-reinforcing material having an improved adhesion between the rubber and the adherend, and a rubber article produced by using the rubber-reinforcing material.

As a result of extensive researches in view of the above object, the inventors have found that a strong and durable rubber-to-adherend adhesion is attained by coating the adherend with a specific adhesive composition, and vulcanizing an unvulcanized rubber while bringing it into press-contact with the adhesive composition optionally after irradiating the adhesive composition with ultraviolet light or radiation. The present invention has been accomplished on the basis of this finding.

Thus, the present invention provides an adhesive composition for rubbers comprising (A) a conjugated diene polymer having a weight-average molecular weight of 500 to 100,000 and (B) an electron pair-donating basic compound.

The present invention further provides an ultraviolet- or radiation-curable adhesive composition for rubbers comprising (A) a conjugated diene polymer having a weight-average molecular weight of 500 to 100,000, (C) a compound having in its molecule three or more functional groups selected from the group consisting of acryloyloxy group, methacryloyloxy group and terminal groups represented by the following formula I:

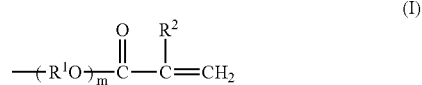

(I)

wherein $R^1$ is $C_2$-$C_5$ alkylene group; $R^2$ is hydrogen or $C_1$-$C_2$ alkyl group; and m is an integer of 0 to 5, and (D) a compound having in its molecule one or two groups selected from the group consisting of acryloyloxy group and methacryloyloxy group.

The present invention still further provides a method for bonding a rubber to an adherend via the adhesive composition mentioned above, comprising: coating at least a part of a surface of the adherend with the adhesive composition to form an adhesive layer, and vulcanizing an unvulcanized rubber while bringing it into press-contact with the adhesive layer, optionally after irradiating the adhesive layer with ultraviolet light or radiation.

The present invention still further provides a rubber-reinforcing material produced by the above method, and a rubber article particularly a tire reinforced by the rubber-reinforcing material.

BEST MODE FOR CARRYING OUT THE INVENTION

Figure 1:
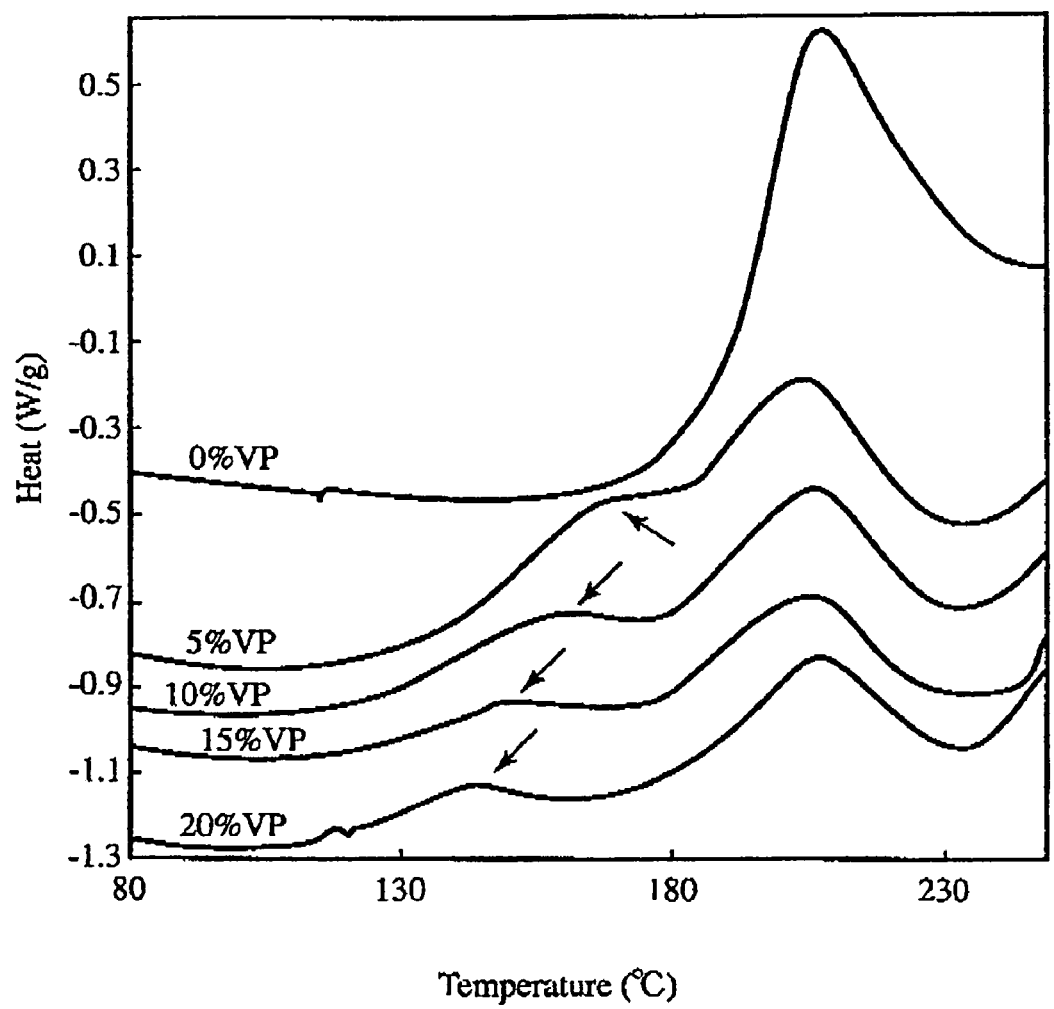
FIG. 1 is a graph showing a heat-of-reaction curve as measured by a differential scanning calorimeter which shows accelerated vulcanization of methacrylated polybutadiene as a conjugated diene polymer by 4-vinylpyridine as an electron pair-donating basic compound.

The first adhesive composition of the present invention comprises (A) a conjugated diene polymer having a weight-average molecular weight of 500 to 100,000 and (B) an electron pair-donating basic compound.

The upper limit of the weight-average molecular weight (Mw) of the component A is not particularly restricted unless the adhesive composition shows an excessively high viscosity and becomes difficult to be processed. However, when exceeding 100,000, the coating of the adhesive composition tends to be difficult. When the Mw is less than 500, a sufficient adhesiveness cannot be sometimes atained by the vulcanization of the press-contacted unvulcanized rubber. Considering the above, Mw is preferably 500 to 100,000.

The conjugated diene polymer as the component A may include conjugated diene homopolymers, conjugated diene copolymers and modified polymers or copolymers thereof. Examples of the conjugated diene monomers include 1,3-butadiene, isoprene and 1,3-hexadiene, with 1,3-butadiene being preferred. The conjugated diene copolymers are preferably conjugated diene-aromatic vinyl copolymers. The aromatic vinyl monomer may be styrene or α-methylstyrene, with styrene being preferred. The conjugated diene polymer preferably contains in its main molecular chain units containing a carbon-carbon double bond having hydrogen at its allyl position so as to provide sites capable of easily forming cross-link by the cross-linking reaction with sulfur. Examples of the conjugated diene polymers include polyisoprene, polybutadiene, styrene-butadiene copolymers and isoprene-butadiene copolymers. It is preferred for the conjugated diene polymer to be in a liquid state at a blending temperature for preparing the adhesive composition and particularly even at 0° C. or lower in view of good workability and easiness of the mixing step for preparing the adhesive composition. It is also preferred to be in a liquid state with a low vapor pressure even at 50° C. or higher. However, the liquid state of the conjugated diene polymer at the blending temperature is not critical as long as the conjugated diene polymer presents in a liquid state in the resultant adhesive composition.

Also usable are modified polymers produced by introducing functional groups having a radically-polymerizable unsaturated double bond into ends of the conjugated diene polymers. Examples of the functional groups include vinyl group, acryloyl group, methacryloyl group, acryloyloxy group, methacryloyloxy group and allyl group. Particularly preferred as the modified polymer are butadiene polymers having at their ends acryloyl group, methacryloyl group, acryloyloxy group or methacryloyloxy group. The modified polymers are available as commercial products or trade samples.

For example, acrylated polybutadienes produced by introducing acryloyl group ($CH_2$=CHCO—) into the ends of butadiene polymers are available from Osaka Yuki Kagaku Kogyo, Co., Ltd. under the trademark "BAC45" (Mw of polybutadiene moiety: 2,800; viscosity: 3.4 Pa·s; saponification value: about 49). Also, methacrylated polybutadienes represented by the following formula:

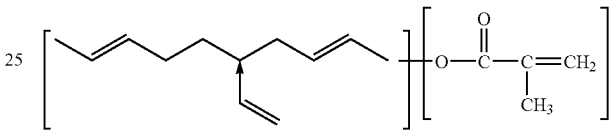

are available from Ricon Resins Inc. under the trademarks "RIACRYL3100" (Mw: 5,100; number of methacryloyl (oxy) groups; 2/molecular chain), "RIACRYL3500" (Mw: 6,800; number of methacryloyl groups: 9/molecular chain) and "RIACRYL3801" (Mw: 3,200; number of methacryloyl (oxy) groups: 8/molecular chain).

The electron pair-donating basic compound as the component B may include compounds containing nitrogen atom having a lone pair or compounds capable of producing compounds having a lone pair by thermal decomposition.

Examples of the compounds containing nitrogen atom having a lone pair include amine compounds such as (a) aromatic canines, (b) aldehyde amines, (c) guanidines, (d) thiouric acids, (e) heterocyclic amines and (f) polymerizable monomers having aliphatic amine residues or heterocyclic amine residues and further having a carbon-carbon double bond. The aromatic amines (a) may include amino-containing aromatic compounds such as aniline, m-phenylenediamine and 2,4-toluylenediamine. The aldehyde amines (b) may include n-butylaldehyde aniline. The guanidines (c) may include diphenylguanidine and di-o-tolylguanidine. The thiouric acids (d) may include thiocarbanilide, diethylthiourea and tetramethylthiourea. The heterocyclic amines (e) may include compounds having a nitrogen-containing heterocyclic ring such as pyridine and 2-methylimidazole. The polymerizable monomers (f) may include 2-vinylpyridine, 4-vinylpyridine, m-(N,N-dimethylamino)styrene, p-(N,N-dimethylamino)styrene, acrylamide, methacrylamide, N-methylacrylamide, N-isopropylacrylamide, N-n-butylacrylamide, N-n-octylacrylamide, N,N-dimethylacrylamide, 1-vinylimidazole, allylamine, 2,5-distyrylpyridine, 2-dimethylaminoethylmethacrylate, N-vinyl-2-pyrrolidone, 2-vinyl-2H-indazole, 4-diisopropylamino-1-butene, trans-2-butene-1,4-diamine, 2-vinyl-4,6-diamino-1,3,5-triazine, 4-methyl-5-vinylthiazole, N-vinylformamide, N,N-dimethylaminoethylacrylate, N,N-diethylaminopropylacrylamide, acryloylmorpholine, and N,N-diethylacrylamide.

In addition to the above compounds, also usable as the compounds containing nitrogen atom having a lone pair are (g) aliphatic amines and (h) amine compounds other than the compounds (a) to (g). Examples of the aliphatic noes (g) include aliphatic monoamines such as dibutylamine; diamines such s ethylenediamine; and high-molecular amines such as polyethylenepolyamine. Examples of the amine compounds (h) other than the compounds (a) to (g) include substituted amine compounds having acrylated or methacrylated primary or secondary amino groups.

Of the compounds (a) to (h) containing nitrogen atom having a lone pair, preferred are the compounds (a) to (f), and more preferred are the compounds (e) and (f).

The compounds capable of producing compounds containing a structure having a lone pair by thermal decomposition are preferably known vulcanization accelerators, for example, disulfide compounds such as tetramethylthiuram disulfide. The compounds capable of producing compounds containing a structure having a lone pair by thermal decomposition are preferably decomposed upon vulcanization for adhesion at a vulcanization temperature of 130 to 180° C.

When vulcanizing the unvulcanized rubber while bringing it into press-contact with the adhesive lyaer which is formed by coating at least a part of the surface of the adherend with the adhesive composition, the sulfur in the unvulcanized rubber migrates into the adhesive layer to create a strong adhesion between the adherend and the rubber because of the co-vulcanization of the component A and the rubber component. The component B catalyzes the reaction between the unsaturated moieties of the component A and the sulfur migrating from the unvulcanized rubber. The vulcanization accelerating effect of the component B can be confirmed from the heat-of-reaction curve measured by a differential scanning calorimeter at a temperature rise rate of 5° C./min. A comparative composition comprising a mixture of 100 parts by weight of the component A and 3 parts by weight of sulfur (but containing no component B) shows no peak of reaction heat attributable to the vulcanization in a temperature range of 190° C. or lower of its heat-of-reaction curve. On the contrary, a mixture of 100 parts by weight of the adhesive composition of the present invention and 3 parts by weight of sulfur shows a peak of reaction heat attributable to the vulcanization in a temperature range of 190° C. or lower of its heat-of-reaction curve. At the reaction temperature of 190° C. or lower, the vulcanization generally proceeds dominantly by a ring opening reaction caused by the vulcanization accelerator or electron pair-donating base rather than by the radical vulcanization. In an adhesive composition containing a component having a relatively acidic end group such as (meth)acryloyl group, the electron pair-donating base is difficult to participate in the vulcanization. Therefore, the addition of the electron pair-donating base (component B) is required to facilitate the vulcanization.

The donating of electron pair from the electron pair-donating base (component B) to the sulfur-based vulcanizing agent such as cyclic sulfur $S_8$ means occurrence of donor-acceptor interaction. Therefore, the amount of sulfur migrating from the unvulcanized rubber into the adhesive composition vanes depending upon the content of tho electron pair-donating base in the adhesive composition and its basicity against sulfur. In this regard, the inventors have found that the amount of migrating sulfur generally increases with increasing amount of the electron pair-donating base and increasing basicity against sulfur. When the amount of sulfur distributed in the adhesive layer of the adhesive composition increases, the amount of sulfur present at a boundary between the adhesive layer and the rubber also increases to enhance the bonding by the sulfur vulcanization. Therefore, the addition of the electron pair-donating base (component B) is required to facilitate the migration of the vulcanizing agent into the adhesive composition.

The addition amount of the component B varies depending upon the electron pair-donating capability of the base, and is preferably 0.2 to 50 parts by weight based on 100 parts by weight of the component A. When less than 0.2 part by weight, the component B fails to show the vulcanization accelerating effect. When more than 50 parts by weight, physical properties of the adhesive composition are deteriorated because of excessive vulcanization.

The adhesive composition may optionally contain the following component C (30 to 80 parts by weight based on 100 parts by weight of the component A) and/or the component D (3 to 60 parts by weight based on 100 parts by weight of the component A).

The component (C) is a compound having, per one molecule, three or more, preferably 3 to 8 functional groups which is cross-linkable by the irradiation with ultraviolet light or radiation. Examples of the preferred functional groups include acryloyloxy group, methacryloyloxy group and functional groups represented by the formula I:

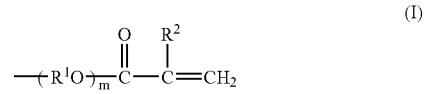

wherein $R^1$ is $C_2$-$C_5$ alkylene group, preferably ethylene group or propylene group; $R^2$ is hydrogen or $C_1$-$C_3$ alkyl group, preferably hydrogen or methyl group; m is an integer of 0 to 5, preferably 1 to 3, with the groups represented by the formula I being more preferred. Examples of the compounds having three or more acryloyloxy or methacryloyloxy groups include esters of a tri- or more valent polyhydric alcohol and acrylic or methacrylic acid. The polyhydric alcohol preferably used may be glycerol, trimethylolethane, trimethylolpropane, diglycerol, pentaerythritol and dipentaerythritol. The compounds having three or more functional groups represented by the formula I are commercially available and exemplified by pentaerythritol polyethoxyacrylate having the following formula:

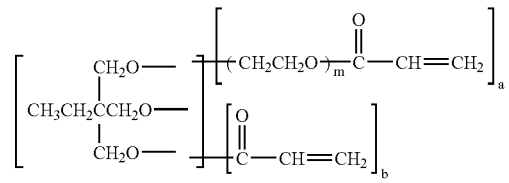

wherein m×a=3 and a+b=3, available from Nippon Kayaku Co., Ltd. under the trademark "KAYARAD THE-330"; pentaerythritol polypropoxyacrylate available from Nippon Kayaku Co., Ltd. under the trademarks "KAYARAD TPA-320" and "KAYARAD TPA-330"; dipentaerythritol polyacrylate available from Arakawa Kagaku Kogyo Co., Ltd. under the trademark "BEAMSET 700"; and pentaerythritol polyacrylate available from Arakawa Kagaku Kogyo Co., Ltd. under the trademark "BEAMSET 710."

The component (D) serves as a viscosity modifier, and is preferably a mono- or di-functional liquid compound having one or two functional groups which is radically polymerizable by the irradiation of ultraviolet light or radiation, Of these compounds, preferred are polyoxyalkylene derivatives having one or two acryloyloxy or methacryloyloxy groups in one molecule. Such viscosity modifiers may be commercially available. Examples of the monofunctional compounds include phenoxypolyethylene glycol monoacrylate represented by the formula:

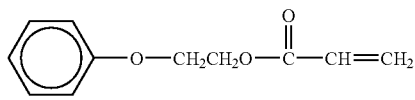

wherein n is 4, available from Shin-Nakamura Kagaku Kogyo Co., Ltd. under the trademarks "AMP-60G" and "APG-400"; tetrahydrofurfuryl monoacrylate available from SARTOMER Inc. under the trademark "SR-285"; and isooctyl monoacrylate available from SARTOMER Inc. under the trademark "SR-440." Examples of the difunctional low-molecular compounds include polypropylene glycol diacrylate represented by the formula:

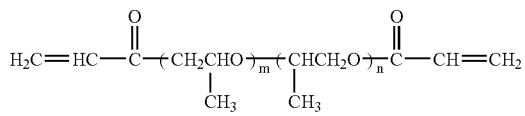

wherein m+n=7, available from Shin-Nakamura Kagaku Kogyo Co., Ltd. under the trademark "APG-400"; and polypropylene glycol dimethacrylate available from Shin-Nakamura Kagaku Kogyo Co., Ltd. under the trademark "9PG."

The adhesive composition may also optionally contain an appropriate low-viscosity liquid having a racial reactivity according to processing requirements.

Further, the adhesive composition may optionally contain at least one additive selected from the group consisting of epoxy compounds, inorganic fillers and high-molecular fillers in a total amount of 10 to 40 parts by weight based on 100 parts by weight of the component A.

The epoxy compounds are cross-linked by heating to impart ductility and toughness to the adhesive composition. Examples thereof include novolak epoxy resins produced by epoxidating a condensate of a phenol compound and formaldehyde, and novolak phenol resins produced by introducing an epoxy or (meth)acrylic group into a condensate of a phenol compound and formaldehyde. Commercially available epoxy compounds are exemplified by epoxy novolak acrylate (trademark "ENA") and novolak acrylate having epoxy and carboxyl groups (trademark "ENC") which are available from Kagawa Chemical Co., Ltd.

The inorganic fillers and the high-molecular fillers are preferably added to reduce production costs of the adhesive composition, simultaneously with imparting ductility and toughness thereto. Examples of the inorganic fillers include clay, silica, talc, and carbon black. Commercially available clay is exemplified by montmorillonite clay available from NANOCOR INC. under the trademarks "Nanomer PGW", "Nanomer PGA", "Nanomer PGV" and "Nanomer PGN." Examples of the high-molecular fillers include copolymers of isobutylene and maleic anhydride, modified polybutadienes, and modified acrylonitrile-butadiene copolymers. Commercially available high-molecular fillers are exemplified by copolymers of isobutylene and maleic anhydride available from Kuraray Co., Ltd. under the trademarks "ISOBAN 10", "ISOBAN 04" and "ISOBAN 110", amine-modified acrylonitrile-butadiene copolymer (trademark "HYCAR ATBN 1300×16") and carboxyl-modified acrylonitrile-butadiene copolymer (trademark "HYCAR CTBN 1300×8") available from Ube Industries, Ltd.

The second adhesive composition of the present invention comprises (A) a conjugated diene polymer having a weight-average molecular weight of 500 to 100,000, (C) a compound having in its colocule three or more functional groups cross-linkable by the irradiation of ultraviolet light or radiation, and (D) a viscosity modifier. The components A, C and D are the same as those mentioned above. Therefore, the details thereof are omitted here.

The blending amounts of the components A, C and D are not particularly restricted as long as a strong bonding force between the adherend and rubber is attained, and preferably 30 to 80 parts by weight for the components C and 3 to 60 parts by weight for the component D each based on 100 parts by weight of the component A.

The second adhesive composition may further contain at least one additive selected from the group consisting of epoxy compounds, inorganic fillers, high-molecular fillers and basic compounds in a total amount of 10 to 40 parts by weight based on 100 parts by weight of the component A. The epoxy compounds, inorganic fillers and high-molecular fillers may be selected from those optionally added to the first adhesive composition. Also, the basic compounds may be selected from those used as the component B in the first adhesive composition.

In addition, the second adhesive composition preferably contains a pbotoinitiator such as 2,4-diethylthioxanthone (for example, "KAYACURE DETX-S," trademark, available from Nippon Kayaku Co., Ltd.) and isoamyl p-dimethylaminobenzoate (for example, "KAYACURE DMBI," trademark available from Nippon Kayaku Co., Ltd.) in an amount of 0.1 to 10 parts by weight based on 100 parts by weight of the component A. Further, the second adhesive composition may contain sulfur (for example, powdery sulfur available from Karuizawa Seisakusho Co., Ltd,), a vulcanization accelerator (for example, mercaptobenzothiazole available from Flexys Inc. under the trademark "Perkacit MBT PDR-D", and disulfide available from Akuzo Inc. under the trademark "Lucidol S-50"), or peroxide, each in an amount of 0.1 to 3 parts by weight based on 100 parts by weight of the component A.

The material of the adherend to be bonded to the rubber is not particularly restricted, and is preferably thermoplastic resin. Examples of the thermoplastic resins include polyamides, polyesters, polyolefins such as polypropylene and polyethylene, polycarbonates, polyacrylates, styrene resins such as ABS resin, and vinyl chloride resins. Of these thermoplastic resins, preferred are polyesters having a high mechanical strength which are not easily bonded to rubbers by ordinary methods. The plastic adherend to be used in the present invention may be in any form such as film, fibers, non-woven fabric, monofilament cord and multifilament cord, and may be extruded articles or injection-molded articles.

In the bonding method of the present invention, the adhesive composition is applied to at least a part of a surface of the adherend, for example, one surface of a sheet-like adherend, by immersion; brushing, casting, spraying, roll-coating, knife-coating, etc., to form a coating film. The surface of the adherend may be treated in advance byelectron bean, microwave, corona discharge, plasma treatment, etc. The thickness of the adhesive composition layer is preferably 0.5 to 50 μm and more preferably 1 to 10 μm.

The adhesive composition layer is then irradiated with ultraviolet light or radiation. The radiation may include electron beam, gamma ray, etc., and may be irradiated by known methods. In general the exposure dose is 100 to 3,000 mJ/cm² and the exposure time is 1 to 30 s for the ultraviolet light irradiation, and the exposure dose is 2 to 50 MRad and the exposure time is 0.5 to 30 s for the electron beam irradiation. The adhesive composition is hardened to some extent by the radical reaction induced by the irradiation. The irradiation of ultraviolet light or radiation can be omitted for the first adhesive composition. By heating at 140 to 190° C. for 10 to 30 min while bringing an unvulcanized rubber into press-contact with the adhesive composition layer under a pressure of 5 to 50 kgf/cm², co-vulcanization reaction occurs between the base polymer (component A) of the adhesive composition and the rubber, resulting in a strong adhesion between the adhesive composition and the rubber.

In the bonding method of the present invention, it is preferred to form an undercoat layer (primer layer) on at least a part of the surface of the adherend, and then form the coating film of the adhesive composition thereon. The thickness of the undercoat layer is preferably 1 to 10 μm. As the undercoat composition, there may be used known suitable adhesives according to the material of the adherend. Although not particularly restricted, the undercoat composition preferably comprises (E) 100 parts by weight of a compound having a bisphenol backbone represented by the following formula II:

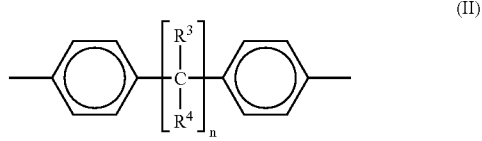

(II)

wherein R³ and R⁴ are each independently hydrogen or C₁-C₃ alkyl group, preferably hydrogen or methyl group; and n is an integer of 1 to 3, and (F) 5 to 50 parts by weight of a compound having in its molecule three or more acryloyloxy and/or methacryloyloxy groups.

The component E preferably has, in addition to the bisphenol backbone represented by the formula II, an end group represented by the following formula III:

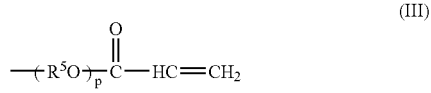

(III)

wherein R⁵ is C₂-C₅ alkylene group, preferably ethylene group; and p is an integer of 1 to 5, preferably 1 to 3.

The component E may be commercially available as ethoxylated bisphenol F diactylate represented by the formula:

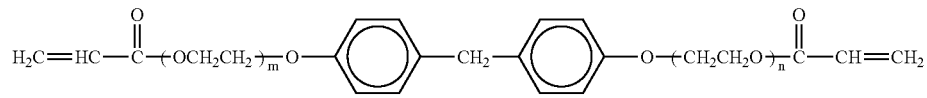

wherein m+n=4 (available from Nippon Kayaku Co., Ltd. under the trademark "KAYARAD R-712"), ethoxylated bisphenol A diacrylate (available from Nippon Kayaku Co., Ltd. under the trademark "KAYARAD R-551"), ethoxylated bisphenol A dimethacrylate (available from SARTOMER Inc. under the trademarks "SR-348", "SR-480" and "SR9036"), and ethoxylated bisphenol A diacrylate (available from Arakawa Kagaku Kogyo Co., Ltd. under the trademark "BEAMSET 750").

As the component F, there may be used the same compounds as used as the component C of the adhesive composition.

To enhance the strength of the coating film, the undercoat composition may contain a conjugated diene polymer selected from those as used for the component A of the adhesive composition in an amount of 0.5 to 10 parts by weight based on 100 parts by weight of the component E, and may also contain, if desired, the viscosity modifier and the photoinitiator mentioned above in amounts of 5 to 30 parts by weight and 0.1 to 5 parts by weight, respectively, based on 100 parts by weight of the Component E. Further, the undercoat composition may contain a styrene monomer as a radical reaction promoter in an amount of 1 to 20 parts by weight based on 100 parts by weight of the component E, In addition to the above components, the undercoat composition may further contain at least one additive selected from the group consisting of the same opoxy compounds, inorganic fillers, high-molecular fillers and basic compounds as described in connection with the adhesive composition in a total amount of 5 to 10 parts by weight based on 100 parts by weight of the component E.

The surface of the undercoat layer formed from the above composition is preferably irradiated with ultraviolet light or radiation.

In a preferred embodiment of the present invention, a composite having a laminated structure of adherend/undercoat layer/adhesive composition layer/rubber is produced by forming the undercoat layer on the surface of the adherend; laminating the adhesive composition layer on the undercoat layer; irradiating, if desired, the adhesive composition layer with ultraviolet light or radiation; and performing vulcanization while bringing an unvulcanized rubber into press-contact.

The rubber used in the present invention is not particularly restricted. Examples of the rubber include natural rubbers; conjugated diene synthetic rubbers such as polyisoprene synthetic rubber (IR), polybutadiene rubber (BR), styrene-butadiene copolymer rubber (SBR), acrylonitrile-butadiene rubber (NBR), chloroprene rubber (CR) and butyl rubber (IIR); ethylene-propylene copolymer rubber (EPM); ethylene-propylene-diene copolymer rubber (EPDM); and polysiloxane rubbers, with natural rubbers and conjugated diene synthetic rubbers being preferred. These rubbers may be used in combination of two or more.

The rubber may be vulcanized in the presence of a vulcanizing agent. Examples of the vulcanizing agents include sulfur; thiuram polysulfide compounds such as tetramethylthiuram disulfide and dipentamethylenethiuram tetrasulfide; 4,4-dithiomorpholine; p-quinone dioxim; cyclic sulfur imides; and peroxides, with sulfur being preferred.

The rubber may contain, in addition to the above components, various additives ordinarily used in rubber industries, for example, fillers such as carbon black and silica, vulcanization accelerators such as aluminum hydroxide, antioxidants and softeners. The rubber may be made into a composite with particles, fibers and cloths of various materials.

The present invention is described in more detail by reference to the following examples. However, it should be noted that the following examples are only illustrative and not intended to limit the invention thereto.

A composite of a rubber and an adherend was prepared by the following method, and subjected to various tests.

1. Polyester Film/Rubber Composite

An undercoat composition shown in Table 1 was applied onto one surface of a 100 μm-thick polyethylene terephthalate film (available from Teijin Limited under the trademark "TETRON TYPE-O") using a film coater to form an undercoat layer, which was then irradiated with ultraviolet light (for 5 s at an intensity of 500 mJ/cm$^2$ and for 10 s at an intensity of 1,000 mJ/cm$^2$) using an ultraviolet irradiation apparatus ("ECS-301G1" available from EYE GRAPHICS Co., Ltd.), or irradiated with electron beam (exposure dose: 40 or 25 MRad) using an electron beam irradiation apparatus ("ELECTROCURTAIN CB250/15/180L" available from EYE GRAPHICS Co., Ltd.).

Next, the treated undercoat layer was coated with an adhesive composition shown in Table 1 using a film coater to form an adhesive layer, After ultraviolet irradiation (for 5 s at an intensity of 500 mJ/cm$^2$ and for 10 s at an intensity of 1,000 mJ/cm$^2$) or electron beam irradiation (exposure dose: 7, 15 or 20 MRad) or without irradiation, the vulcanization was performed under the following conditions to obtain a 80 mm×80 mm polyester film/rubber composite.

Unvulcanized Rubber
thickness: 2.3 mm
formulation: shown in the following table.

| Formulation | part by weight |
|---|---|
| Natural rubber | 100 |
| Carbon black | 40 |
| Stearic acid | 2 |
| Petroleum softening agent | 2 |
| Zinc white | 5 |
| Antioxidant** | 1.5 |
| N-t-butyl-2-benzothiazolylsulfenamide | 1.2 |
| Diphenylguanidine | 0.75 |
| Sulfur | 2.5 |

**N-phenyl-N-isopropyl-p-phenylenediamine

Vulcanization Conditions:
Contact pressure: 15 kg/cm$^2$
Vulcanizing temperature: 160° C.
Vulcanizing time: 20 min 2. Polyester Cord/Rubber Composite In continuous manner, a polyethylene terephthalate tire cord having a twisting structure of 1,500 d/2, a ply twist number of 39 turn/10 cm and a cable twist number of 39 turn/10 cm was immersed in the undercoat composition shown in Table 1 and passed between squeeze rolls to remove the excess undercoat composition. Then, the tire cord was passed through a photo-curing zone of an ultraviolet irradiation apparatus at a speed of 150 cm/min to irradiate the undercoat layer with ultraviolet light (for 10 s at an intensity of 1,000 mJ/cm$^2$).

The obtained tire cord having the ultraviolet-cured undercoat layer was immersed in the adhesive composition shown in Table 1 and passed between squeeze rolls to remove the excess adhesive composition. Then, the tire cord was passed through a photo-curing zone of an ultraviolet irradiation apparatus at a speed of 150 cm/min to irradiate the adhesive composition layer with ultraviolet light (for 10 s at an intensity of 1,000 mJ/cm$^2$).

The adhesive-treated polyester cord was embedded in a 2.3 mm-thick unvulcanized rubber having tho formulation as shown in the above Table, and vulcanized under a pressure of 20 kgf/cm$^2$ at 160° C. for 20 min to obtain a polyester cord/rubber composite.

3. Nylon Cord/Rubber Composite

The same procedure as in the production of the polyester cord/rubber composite was repeated except for using a tire cord having a twisting structure of 1,260 d/2, a ply twist number of 39 turn/10 cm and a cable twist number of 39 turn/10 cm and irradiating the undercoat layer with electron beam (exposure dose: 40 MRad) to obtain a nylon cord/rubber composite.

4. Film Peel Test

The polyester film/rubber composite was cut into 25 mm in width to prepare a test specimen for peel test.

The test specimen was tested for peeling between the rubber layer and the polyester film at a peel angle of 180° (T-peel) and a peel rate of 50 mm/min to measure a peel strength. The area ratio of the adhering rubber (rubber adhesion rate) to the surface area of the film after peeling was measured to rank the rubber adhesion according to the following table. The results are shown in Table 1.

| Ranks | Rubber adhesion rate | Condition of film after peeling |
|---|---|---|
| A+ | — | Broken |
| A | 100-80% | Not broken |
| B | 80-60% | Not broken |
| C | 60-40% | Not broken |
| D | 40-20% | Not broken |
| E | 20-0% | Not broken |

5. Cord Tensile Test

The tire cord was dug out of each of the polyester cord/rubber composite and nylon cord/rubber composite, and peeled off from each composite at a rate of 30 cm/min to measure a peel resistance, which was employed as the adhesion strength (tension). The area ratio of the adhering rubber to the surface area of the cord after peeling was measured to rank the rubber adhesion according to the following table. The results are shown in Table 1.

| Ranks | Rubber adhesion rate | Condition of cord after peeling |
|-------|----------------------|--------------------------------|
| A+    | —                    | Broken                         |
| A     | 100-80%              | Not broken                     |
| B     | 80-60%               | Not broken                     |
| C     | 60-40%               | Not broken                     |
| D     | 40-20%               | Not broken                     |
| E     | 20-0%                | Not broken                     |

6. Heat-of-Reaction Curve

The respective adhesive compositions were irradiated with ultraviolet light (for 5 s at an intensity of 500 mJ/cm$^2$) to prepare films. Each film was cut into small pieces and screened by a 30 mesh metallic sieve to obtain each powder. Each 100 parts by weight of powder was uniformly kneaded with 3 parts by weight of insoluble sulfur (under 80 mesh) to prepare each specimen.

A stainless steel pressure pan containing the specimen was set in a differential scanning calorimeter. The temperature was held at 70° C. at which vulcanization does not initiate for 5 min, and then raized at a rate of 5° C./min to measure the heat of reaction (W/g) and prepare a heat-of-reaction curve from the measured results.

An example of the heat-of-reaction curves thus prepared is illustrated in FIG. 1. The formulation of each specimen is shown below.

Formulation of Specimen

| | Adhesive composition (part by weight) | | |
|---|---|---|---|
| | Component A | Component B | Sulfur (part by weight) |
| 0% VP | 100 | 0 | 3 |
| 5% VP | 95 | 5 | 3 |
| 10% VP | 90 | 10 | 3 |
| 15% VP | 85 | 15 | 3 |
| 20% VP | 80 | 20 | 3 |

Component A: Methacrylated polybutadiene (RIACRYL3100)
Component B: 4-vinylpyridine As seen from FIG. 1, the curve for the composition (0% VP) containing no component B (electron pair-donating basic compound: 4-vinylpyridine) showed a flat base line with no peak in a temperature region of 190° C. or lower, especially 180° C. or lower. In the curves for the compositions that were added with the component B, shoulder peaks (indicated by arrows) attributable to the vulcanization reaction appeared in a temperature region of 120 to 190° C. The inflection point of each shoulder peak calculated by differential method is shown in Table 1 as the heat-of-reaction peak temperature.

7. Migrating Amount of Sulfur (Rubber→Adhesive Composition)

The polyester film/rubber composite prepared in the manner described above was cut in the direction perpendicular to the surface thereof. The cut film was cross-sectionally observed by a scanning electron microscope coupled with an X-ray analyzer to count the fluorescent X-ray from sulfur in the rubber layer, adhesive layer and film layer. The amount of sulfur migrated from the rubber layer into the adhesive layer was evaluated by whether the sulfur content in the adhesive layer is high or low as compared to the average distribution of sulfur content in the rubber layer.

8. Pneumatic Tire

A polyethylene terephthalate tire cord having a twisting structure of 1,500 d/2, a ply twist number of 39 turn/10 cm and a cable twist number of 39 turn/10 cm was immersed in the undercoat composition shown in Table 1 and passed through squeeze rolls to remove the excess undercoat composition. Then, the tire cord was passed through a photo-curing zone of an ultraviolet irradiation apparatus at a speed of 150 cm/min to irradiate the resultant undercoat layer with ultraviolet light (for 10 s at an intensity of 1,000 mJ/cm$^2$).

The tire cord having the ultraviolet-cured undercoat layer was immersed in the adhesive composition shown in Table 1 and passed through squeeze rolls to remove the excess adhesive composition. Then, the tire cord was passed through a photo-curing zone of an ultraviolet irradiation apparatus at a speed of 150 cm/min to irradiate the resultant adhesive layer with ultraviolet light (for 10 s at an intensity of 1,000 mJ/cm$^2$), thereby preparing adhesive-treated polyester cords of Comparative Example 14 and Example 37.

The adhesive-coated polyester cords of Comparative Example 14 and Example 37 were respectively used as a single carcass ply to produce a pneumatic radial tire having a size of 155R13.

9. Adhesion Strength of Polyester Cord/Rubber Composite after Tire Running

Each tire of Comparative Example 14 and Example 37 was seated on a rim prescribed in JIS D4202, and mounted to an ordinary passenger car for running on a flat asphalt road surface at a speed of 30 km/h over 10 km (preliminary running). The tire of Example 37 was further run on usual road over 10,000 km. The tenacity (N) of the cord after running was measured according to JIS L1017. A sample of 100 mm long in the ply cord direction and 25 mm long in the circumferential direction was cut out by a knife from the side portion of each tire. The cord was dug up from the sample and peeled off from the side rubber at a speed of 30 cm/min to measure the peel resistance (N) which is shown as the adhesion strength in the following tables. Separately, a tire was produced using an RFL formulation which was ordinarily used as a tire cord adhesive and run in the same manner as in the tire of Example 37. The cord tenacity and the adhesion strength of the tire after running are also shown in the folloiwng tables as the reference.

| | Running distance (km) | Cord tenacity after running (N) | Adhesion strength after running (N/cord) |
|---|---|---|---|
| Comparative Example 14 (control tire) | 10 | 228 | 3 |
| Example 37 (inventive tire) | 10,010 | 242 | 21 |
| RFL composition (reference) | 10,010 | 239 | 20 |

TABLE 1-1

|  | Com. Ex. 1 | | Ex. 1 | | Ex. 2 | |
| --- | --- | --- | --- | --- | --- | --- |
|  | Undercoat layer | Adhesive layer | Undercoat layer | Adhesive layer | Undercoat layer | Adhesive layer |
| Component A |  |  |  |  |  |  |
| RIACRYL 3801[*1] |  |  |  |  |  |  |
| RIACRYL 3500[*2] |  |  |  |  |  |  |
| RIACRYL 3100[*3] |  |  |  |  |  |  |
| BAC45[*4] | 12 | 50 | 12 | 50 | 12 | 50 |
| Component D |  |  |  |  |  |  |
| Monofunctional compound |  |  |  |  |  |  |
| SR-285[*8] | 10 |  | 10 |  | 10 |  |
| SR-440[*9] |  | 15 |  |  |  |  |
| AMP-60G[*10] |  |  |  |  |  |  |
| Styrene | 5 |  | 5 |  | 5 |  |
| Polyfunctional compound |  |  |  |  |  |  |
| 9PG[*11] |  | 15 |  | 13 |  | 13 |
| APG-400[*12] | 15 |  | 15 |  | 15 |  |
| Component E |  |  |  |  |  |  |
| SR-348[*13] | 30 |  | 30 |  | 30 |  |
| KAYARAD R551[*14] |  |  |  |  |  | 5 |
| BEAMSET 750[*15] |  |  |  |  |  |  |
| KAYARAD R-712[*16] |  |  |  |  |  |  |
| Component B |  |  |  |  |  |  |
| Amine compound |  |  |  |  |  |  |
| Dibutylamine |  |  |  |  |  |  |
| Ethylenediamine |  |  |  |  |  |  |
| TOMIDE 252[*25] |  |  |  |  |  |  |
| FUJICURE 5100[*26] |  |  |  |  |  |  |
| Aniline |  |  |  |  |  |  |
| Pyridine |  |  |  | 20 |  | 15 |
| Tetramethylthiourea |  |  |  |  |  |  |
| Polymerizable monomer |  |  |  |  |  |  |
| 4-vinylpyridine |  |  |  |  |  |  |
| Acrylamide |  |  |  |  |  |  |
| N-vinyl pyrrolidone |  |  |  |  |  |  |
| Vulcanization accelerator |  |  |  |  |  |  |
| Diphenylguanidine |  |  |  |  |  |  |
| 2-methylimidazole |  |  |  |  |  |  |
| Component C or F |  |  |  |  |  |  |
| KAYARAD THE-330[*17] |  |  |  |  |  |  |
| KAYARAD TPA-320[*18] |  |  |  |  |  |  |
| KAYARAD TPA-330[*19] | 20 | 10 | 20 | 10 | 20 | 10 |
| BEAMSET 710[*20] |  |  |  |  |  |  |
| BEAMSET 700[*21] |  |  |  |  |  |  |
| Epoxy compound |  |  |  |  |  |  |
| ENA[*6] |  |  |  |  |  |  |
| High-molecular filler |  |  |  |  |  |  |
| HYCARATBN[*5] 1300 × 16 |  |  |  |  |  |  |
| ISOBAN 10[*7] | 5 | 5 | 5 | 2 | 5 | 2 |
| VIRON 300[*27] |  |  |  |  |  |  |
| Inorganic filler |  |  |  |  |  |  |
| NANOMER PGW[*22] |  | 2 |  | 2 |  | 2 |
| Photoinitiator |  |  |  |  |  |  |
| KAYACURE DETX-S[*23] | 3 | 3 | 3 | 3 | 3 | 3 |
| KAYACURE DMBI[*24] |  |  |  |  |  |  |
| Adherend | Polyester film | | Polyester film | | Polyester film | |
| Radiation conditions |  |  |  |  |  |  |
| UV exposure (mJ/cm$^2$) | 500 | 500 | 500 | 500 | 500 | 500 |
| UV exposure time (s) | 5 | 5 | 5 | 5 | 5 | 5 |
| EB exposure (MRad) | 0 | 0 | 0 | 0 | 0 | 0 |
| Results of film peel test |  |  |  |  |  |  |
| Peel strength (N/25 mm) | 8 | | 249 | | 231 | |
| Rubber adhesion | E | | A+ | | A | |

TABLE 1-1-continued

|  | Com. Ex. 1 | | Ex. 1 | | Ex. 2 | |
| --- | --- | --- | --- | --- | --- | --- |
|  | Undercoat layer | Adhesive layer | Undercoat layer | Adhesive layer | Undercoat layer | Adhesive layer |
| Results of cord tensile test |  |  |  |  |  |  |
| Cord tension (N/cord) | — |  | — |  | — |  |
| Rubber adhesion | — |  | — |  | — |  |
| Results of differential scanning calorimetry |  |  |  |  |  |  |
| Heat-of-reaction peak temp. (° C.) | None |  | — |  | — |  |
| Analysis by scanning electron microscope-X-ray analyzer |  |  |  |  |  |  |
| Sulfur content in adhesive composition | Lower than rubber layer |  | — |  | — |  |

TABLE 1-2

|  | Ex. 3 | | Ex. 1 | | Com. Ex. 2 | |
| --- | --- | --- | --- | --- | --- | --- |
|  | Undercoat layer | Adhesive layer | Undercoat layer | Adhesive layer | Undercoat layer | Adhesive layer |
| Component A |  |  |  |  |  |  |
| RIACRYL 3801*1 |  |  |  |  |  |  |
| RIACRYL 3500*2 |  |  |  |  |  |  |
| RIACRYL 3100*3 |  |  |  |  | 5 |  |
| BAC45*4 | 12 | 45 | 12 | 50 |  |  |
| Component D |  |  |  |  |  |  |
| Monofunctional compound |  |  |  |  |  |  |
| SR-285*8 | 10 |  | 10 |  |  |  |
| SR-440*9 |  |  |  |  |  |  |
| AMP-60G*10 |  | 13 |  |  | 9 | 54 |
| Styrene | 5 |  | 5 |  | 6 |  |
| Polyfunctional compound |  |  |  |  |  |  |
| 9PG*11 |  |  |  |  |  |  |
| APG-400*12 | 15 |  | 15 | 13 | 9 | 18 |
| Component E |  |  |  |  |  |  |
| SR-348*13 | 30 |  | 30 |  |  |  |
| KAYARAD R551*14 |  |  |  |  |  |  |
| BEAMSET 750*15 |  |  |  |  |  |  |
| KAYARAD R-712*16 |  | 10 |  | 10 | 15 |  |
| Component B |  |  |  |  |  |  |
| Amine compound |  |  |  |  |  |  |
| Dibutylamine |  |  |  |  |  |  |
| Ethylenediamine |  |  |  |  |  |  |
| TOMIDE 252*25 |  |  |  |  |  |  |
| FUJICURE 5100*26 |  |  |  |  |  |  |
| Aniline |  |  |  |  |  |  |
| Pyridine |  | 15 |  | 10 |  |  |
| Tetramethylthiourea |  |  |  |  |  |  |
| Polymerizable monomer |  |  |  |  |  |  |
| 4-vinylpyridine |  |  |  |  |  | 15 |
| Acrylamide |  |  |  |  |  |  |
| N-vinyl pyrrolidone |  |  |  |  |  |  |
| Vulcanization accelerator |  |  |  |  |  |  |
| Diphenylguanidine |  |  |  |  |  |  |
| 2-methylimidazole |  |  |  |  |  |  |
| Component C or F |  |  |  |  |  |  |
| KAYARAD THE-330*17 |  |  |  |  | 20 | 7 |
| KAYARAD TPA-320*18 |  |  |  |  |  |  |
| KAYARAD TPA-330*19 | 20 | 10 | 20 | 10 |  |  |
| BEAMSET 710*20 |  |  |  |  |  |  |
| BEAMSET 700*21 |  |  |  |  |  |  |

TABLE 1-2-continued

|  | Ex. 3 | | Ex. 1 | | Com. Ex. 2 | |
| --- | --- | --- | --- | --- | --- | --- |
|  | Undercoat layer | Adhesive layer | Undercoat layer | Adhesive layer | Undercoat layer | Adhesive layer |
| Epoxy compound |  |  |  |  |  |  |
| ENA[*6] |  |  |  |  | 20 |  |
| High-molecular filler |  |  |  |  |  |  |
| HYCAR ATBN[*5] 1300 × 16 |  |  |  |  | 6 |  |
| ISOBAN 10[*7] | 5 | 2 | 5 | 2 | 5 |  |
| VIRON 300[*27] |  |  |  |  | 2 | 3 |
| Inorganic filler |  |  |  |  |  |  |
| NANOMER PGW[*22] |  | 2 |  | 2 |  |  |
| Photoinitiator |  |  |  |  |  |  |
| KAYACURE DETX-S[*23] | 3 | 3 | 3 | 3 | 3 | 3 |
| KAYACURE DMBI[*24] |  |  |  |  |  |  |
| Adherend | Polyester film | | Polyester film | | Polyester film | |
| Radiation conditions |  |  |  |  |  |  |
| UV exposure (mJ/cm²) | 500 | 500 | 500 | 500 | 500 | 500 |
| UV exposure time (s) | 5 | 5 | 5 | 5 | 5 | 5 |
| EB exposure (MRad) | 0 | 0 | 0 | 0 | 0 | 0 |
| Results of film peel test |  |  |  |  |  |  |
| Peel strength (N/25 mm) | 220 | | 224 | | 20 | |
| Rubber adhesion | A | | A | | E | |
| Results of cord tensile test |  |  |  |  |  |  |
| Cord tension (N/cord) | — | | — | | — | |
| Rubber adhesion | — | | — | | — | |
| Results of differential scanning calorimetry |  |  |  |  |  |  |
| Heat-of-reaction peak temp. (° C.) | — | | — | | None | |
| Analysis by scanning electron microscope-X-ray analyzer |  |  |  |  |  |  |
| Sulfur content in adhesive composition layer | — | | — | | Lower than rubber layer | |

TABLE 1-3

|  | Ex. 5 | | Ex. 6 | | Ex. 7 | |
| --- | --- | --- | --- | --- | --- | --- |
|  | Undercoat layer | Adhesive layer | Undercoat layer | Adhesive layer | Undercoat layer | Adhesive layer |
| Component A |  |  |  |  |  |  |
| RIACRYL 3801[*1] |  |  |  |  |  |  |
| RIACRYL 3500[*2] |  |  |  |  |  |  |
| RIACRYL 3100[*3] | 5 | 10 | 5 | 19 | 5 | 34 |
| BAC45[*4] |  |  |  |  |  |  |
| Component D |  |  |  |  |  |  |
| Monofunctional compound |  |  |  |  |  |  |
| SR-285[*8] |  |  |  | 5 |  |  |
| SR-440[*9] |  |  |  |  |  |  |
| AMP-60G[*10] | 9 | 25 | 9 | 3 | 9 | 3 |
| Styrene | 6 | 3 | 6 | 6 | 6 | 5 |
| Polyfunctional compound |  |  |  |  |  |  |
| 9PG[*11] |  |  |  |  |  |  |
| APG-400[*12] | 9 | 18 | 9 | 18 | 9 | 18 |
| Component E |  |  |  |  |  |  |
| SR-348[*13] |  |  |  |  |  |  |
| KAYARAD R551[*14] |  |  |  |  |  |  |
| BEAMSET 750[*15] |  |  |  |  |  |  |
| KAYARAD R-712[*16] | 15 |  | 15 | 4 | 15 |  |

TABLE 1-3-continued

|  | Ex. 5 | | Ex. 6 | | Ex. 7 | |
| --- | --- | --- | --- | --- | --- | --- |
|  | Undercoat layer | Adhesive layer | Undercoat layer | Adhesive layer | Undercoat layer | Adhesive layer |
| Component B |  |  |  |  |  |  |
| Amine compound |  |  |  |  |  |  |
| Dibutylamine |  |  |  |  |  |  |
| Ethylenediamine |  |  |  |  |  |  |
| TOMIDE 252[*25] |  |  |  |  |  |  |
| FUJICURE 5100[*26] |  |  |  |  |  |  |
| Aniline |  |  |  |  |  |  |
| Pyridine |  | 2 |  | 2 |  | 6 |
| Tetramethylthiourea |  |  |  |  |  |  |
| Polymerizable monomer |  |  |  |  |  |  |
| 4-vinylpyridine |  | 25 |  | 20 |  | 18 |
| Acrylamide |  |  |  |  |  |  |
| N-vinylpyrrolidone |  |  |  |  |  |  |
| Vulcanization accelerator |  |  |  |  |  |  |
| Diphenylguanidine |  |  |  |  |  |  |
| 2-methylimidazole |  |  |  |  |  |  |
| Component C or F |  |  |  |  |  |  |
| KAYARAD THE-330[*17] | 20 | 7 | 20 | 15 | 20 | 9 |
| KAYARAD TPA-320[*18] |  |  |  |  |  |  |
| KAYARAD TPA-330[*19] |  |  |  |  |  |  |
| BEAMSET 710[*20] |  |  |  |  |  |  |
| BEAMSET 700[*21] |  |  |  |  |  |  |
| Epoxy compound |  |  |  |  |  |  |
| ENA[*6] | 20 | 5 | 20 | 5 | 20 | 2 |
| High-molecular filler |  |  |  |  |  |  |
| HYCAR ATBN[*5] 1300 × 16 | 6 |  | 6 |  | 6 |  |
| ISOBAN 10[*7] | 5 |  | 5 |  | 5 |  |
| VIRON 300[*27] | 2 | 2 | 2 |  |  |  |
| Inorganic filler |  |  |  |  |  |  |
| NANOMER PGW[*22] |  |  |  |  | 2 | 2 |
| Photoinitiator |  |  |  |  |  |  |
| KAYACURE DETX-S[*23] | 3 | 3 | 3 | 3 | 3 | 3 |
| KAYACURE DMBI[*24] |  |  |  |  |  |  |
| Adherend | Polyester film | | Polyester film | | Polyester film | |
| Radiation conditions |  |  |  |  |  |  |
| UV exposure (mJ/cm²) | 500 | 500 | 500 | 500 | 500 | 500 |
| UV exposure time (s) | 5 | 5 | 5 | 5 | 5 | 5 |
| EB exposure (MRad) | 0 | 0 | 0 | 0 | 0 | 0 |
| Results of film peel test |  |  |  |  |  |  |
| Peel strength (N/25 mm) |  | 63 |  | 72 |  | 206 |
| Rubber adhesion |  | D |  | D |  | B |
| Results of cord tensile test |  |  |  |  |  |  |
| Cord tension (N/cord) |  | — |  | — |  | — |
| Rubber adhesion |  | — |  | — |  | — |
| Results of differential scanning calorimetry |  |  |  |  |  |  |
| Heat-of-reaction peak temp. (° C.) |  | — |  | 160° C. |  | — |
| Analysis by scanning electron microscope-X-ray analyzer |  |  |  |  |  |  |
| Sulfur content in adhesive composition layer |  | — |  | Lower than rubber layer |  | — |

TABLE 1-4

|  | Ex. 8 | | Ex. 9 | | Ex. 10 | |
| --- | --- | --- | --- | --- | --- | --- |
|  | Undercoat layer | Adhesive layer | Undercoat layer | Adhesive layer | Undercoat layer | Adhesive layer |
| Component A |  |  |  |  |  |  |
| RIACRYL 3801[*1] |  |  |  |  |  |  |
| RIACRYL 3500[*2] |  |  |  |  |  |  |
| RIACRYL 3100[*3] | 5 | 45 | 5 | 55 | 5 | 67 |
| BAC45[*4] |  |  |  |  |  |  |
| Component D |  |  |  |  |  |  |
| Monofunctional compound |  |  |  |  |  |  |
| SR-285[*8] |  |  |  |  |  |  |
| SR-440[*9] |  |  |  |  |  |  |
| AMP-60G[*10] | 9 |  | 9 |  | 9 |  |
| Styrene | 6 | 3 | 6 |  | 6 |  |
| Polyfunctional compound |  |  |  |  |  |  |
| 9PG[*11] |  |  |  |  |  |  |
| APG-400[*12] | 9 | 18 | 9 | 18 | 9 | 12 |
| Component E |  |  |  |  |  |  |
| SR-348[*13] |  |  |  |  |  |  |
| KAYARAD R551[*14] |  |  |  |  |  |  |
| BEAMSET 750[*15] |  |  |  |  |  |  |
| KAYARAD R-712[*16] | 15 | 3 | 15 |  | 15 |  |
| Component B |  |  |  |  |  |  |
| Amine compound |  |  |  |  |  |  |
| Dibutylamine |  |  |  |  |  |  |
| Ethylenediamine |  |  |  |  |  |  |
| TOMIDE 252[*25] |  |  |  |  |  |  |
| FUJICURE 5100[*26] |  |  |  |  |  |  |
| Aniline |  |  |  |  |  |  |
| Pyridine |  |  |  |  |  |  |
| Tetramethylthiourea |  |  |  |  |  |  |
| Polymerizable monomer |  |  |  |  |  |  |
| 4-vinylpyridine |  | 15 |  | 15 |  | 15 |
| Acrylamide |  |  |  |  |  |  |
| N-vinylpyrrolidone |  | 4 |  |  |  |  |
| Vulcanization accelerator |  |  |  |  |  |  |
| Diphenylguanidine |  |  |  |  |  |  |
| 2-methylimidazole |  |  |  |  |  |  |
| Component C or F |  |  |  |  |  |  |
| KAYARAD THE-330[*17] | 20 | 7 | 20 | 7 | 20 | 4 |
| KAYARAD TPA-320[*18] |  |  |  |  |  |  |
| KAYARAD TPA-330[*19] |  |  |  |  |  |  |
| BEAMSET 710[*20] |  |  |  |  |  |  |
| BEAMSET 700[*21] |  |  |  |  |  |  |
| Epoxy compound |  |  |  |  |  |  |
| ENA[*6] | 20 |  | 20 |  | 20 |  |
| High-molecular filler |  |  |  |  |  |  |
| HYCAR ATBN[*5] 1300 × 16 | 6 |  | 6 |  | 6 |  |
| ISOBAN 10[*7] | 5 |  | 5 |  | 5 |  |
| VIRON 300[*27] | 2 | 2 | 2 | 2 | 2 |  |
| Inorganic filler |  |  |  |  |  |  |
| NANOMER PGW[*22] |  |  |  |  |  |  |
| Photoinitiator |  |  |  |  |  |  |
| KAYACURE DETX-S[*23] | 3 | 3 | 3 | 3 | 3 | 2 |
| KAYACURE DMBI[*24] |  |  |  |  |  |  |
| Adherend | Polyester film | | Polyester film | | Polyester film | |
| Radiation conditions |  |  |  |  |  |  |
| UV exposure (mJ/cm$^2$) | 500 | 500 | 500 | 500 | 500 | 500 |
| UV exposure time (s) | 5 | 5 | 5 | 5 | 5 | 5 |
| EB exposure (M Rad) | 0 | 0 | 0 | 0 | 0 | 0 |
| Results of film peel test |  |  |  |  |  |  |
| Peel strength (N/25 mm) | 257 | | 260 | | 186 | |
| Rubber adhesion | A+ | | A+ | | B | |

TABLE 1-4-continued

|  | Ex. 8 | | Ex. 9 | | Ex. 10 | |
| --- | --- | --- | --- | --- | --- | --- |
|  | Undercoat layer | Adhesive layer | Undercoat layer | Adhesive layer | Undercoat layer | Adhesive layer |
| Results of cord tensile test | | | | | | |
| Cord tension (N/cord) | — | | — | | — | |
| Rubber adhesion | — | | — | | — | |
| Results of differential scanning calorimetry | | | | | | |
| Heat-of-reaction peak temp. (° C.) | 150° C. | | — | | — | |
| Analysis by scanning electron microscope-X-ray analyzer | | | | | | |
| Sulfur contant in adhesive composition layer | Higher than rubber layer | | — | | — | |

TABLE 1-5

|  | Ex. 11 | | Com. Ex. 3 | | Ex. 12 | |
| --- | --- | --- | --- | --- | --- | --- |
|  | Undercoat layer | Adhesive layer | Undercoat layer | Adhesive layer | Undercoat layer | Adhesive layer |
| Component A | | | | | | |
| RIACRYL 3801*[1] | | | | | | |
| RIACRYL 3500*[2] | | | | | 10 | 57 |
| RIACRYL 3100*[3] | 5 | 81 | 5 | 100 | | |
| BAC45*[4] | | | | | | |
| Component D | | | | | | |
| Monofunctional compound | | | | | | |
| SR-285*[8] | | | | | | |
| SR-440*[9] | | | | | | |
| AMP-60G*[10] | 9 | | 9 | | 12 | |
| Styrene | 6 | | 6 | | 6 | |
| Polyfunctional compound | | | | | | |
| 9PG*[11] | | | | | | |
| APG-400*[12] | 9 | 5 | 9 | 0 | 12 | 18 |
| Component E | | | | | | |
| SR-348*[13] | | | | | | |
| KAYARAD R551*[14] | | | | | | |
| BEAMSET 750*[15] | | | | | 10 | |
| KAYARAD R-712*[16] | 15 | | 15 | | 20 | |
| Component (B) | | | | | | |
| Amine compound | | | | | | |
| Dibutylamine | | | | | | |
| Ethylenediamine | | | | | | |
| TOMIDE 252*[25] | | | | | | |
| FUJICURE 5100*[26] | | | | | | |
| Aniline | | | | | | |
| Pyridine | | | | | | |
| Tetramethylthiourea | | | | | | |
| Polymerizable monomer | | | | | | |
| 4-vinylpyridine | | 9 | | | | 15 |
| Acrylamide | | | | | | |
| N-vinylpyrrolidone | | | | | | |
| Vulcanization accelerator | | | | | | |
| Diphenylguanidine | | | | | | |
| 2-methylimidazole | | | | | | |
| Component C or F | | | | | | |
| KAYARAD THE-330*[17] | 20 | 3 | 20 | 0 | | |
| KAYARAD TPA-320*[18] | | | | | | |

TABLE 1-5-continued

|  | Ex. 11 | | Com. Ex. 3 | | Ex. 12 | |
| --- | --- | --- | --- | --- | --- | --- |
|  | Undercoat layer | Adhesive layer | Undercoat layer | Adhesive layer | Undercoat layer | Adhesive layer |
| KAYARAD TPA-330*[19] |  |  |  |  | 24 | 7 |
| BEAMSET 710*[20] |  |  |  |  |  |  |
| BEAMSET 700*[21] |  |  |  |  |  |  |
| Epoxy compound |  |  |  |  |  |  |
| ENA*[6] | 20 |  | 20 |  |  |  |
| High-molecular filler |  |  |  |  |  |  |
| HYCARATBN*[5] 1300 × 16 | 6 |  | 6 |  |  |  |
| ISOBAN 10*[7] | 5 |  | 5 |  |  |  |
| VIRON 300*[27] | 2 |  | 2 |  |  |  |
| Inorganic filler |  |  |  |  |  |  |
| NANOMER PGW*[22] |  |  |  |  | 3 |  |
| Photoinitiator |  |  |  |  |  |  |
| KAYACURE DETX-S*[27] | 3 | 2 | 3 | 0 | 3 | 3 |
| KAYACURE DMBI*[24] |  |  |  |  |  |  |
| Adherend | Polyester film | | Polyester film | | Polyester film | |
| Radiation conditions |  |  |  |  |  |  |
| UV exposure (mJ/cm$^2$) | 1000 | 1000 | 1000 | 1000 | 1000 | 500 |
| UV exposure time (sec) | 10 | 10 | 10 | 10 | 10 | 5 |
| EB exposure (MRad) | 0 | 0 | 0 | 0 | 0 | 0 |
| Results of film peel test |  |  |  |  |  |  |
| Peel strength (N/25 mm) | 98 | | 8 | | 270 | |
| Rubber adhesion | C | | E | | A | |
| Results of cord tensile test |  |  |  |  |  |  |
| Cord tension (N/cord) | — | | — | | — | |
| Rubber adhesion |  |  |  |  |  |  |
| Results of differential scanning calorimetry |  |  |  |  |  |  |
| Heat-of-reaction peak temp. (° C.) | — | | None | | — | |
| Analysis by scanning electron microscope-X-ray analyzer |  |  |  |  |  |  |
| Sulfur content in adhesive-composition layer |  |  | Lower than rubber-layer | |  |  |

TABLE 1-6

|  | Com. Ex. 4 | | Ex. 13 | | Com. Ex. 5 | |
| --- | --- | --- | --- | --- | --- | --- |
|  | Undercoat layer | Adhesive layer | Undercoat layer | Adhesive layer | Undercoat layer | Adhesive layer |
| Component A |  |  |  |  |  |  |
| RIAGRYL 3801*[1] | 10 | 50 | 10 | 50 | 5 | 42 |
| RIACRYL 3500*[2] |  |  |  |  |  |  |
| RIACRYL 3100*[3] |  |  |  |  |  |  |
| BAC45*[4] |  |  |  |  |  |  |
| Component D |  |  |  |  |  |  |
| Monofunctional compound |  |  |  |  |  |  |
| SR-285*[8] | 2 | 15 | 2 |  |  |  |
| SR-440*[9] |  |  |  |  | 10 | 15 |
| AMP-60G*[10] |  |  |  |  |  |  |
| Styrone |  |  |  |  |  |  |
| Polyfunctional compound |  |  |  |  |  |  |
| 9PG*[11] |  |  |  |  |  |  |
| APG-400*[12] |  | 20 |  | 17 | 8 | 20 |
| Component E |  |  |  |  |  |  |
| SR-348*[13] |  |  |  |  |  |  |
| KAYARAD R551*[14] |  |  |  | 32 |  |  |

TABLE 1-6-continued

|  | Com. Ex. 4 | | Ex. 13 | | Com. Ex. 5 | |
| --- | --- | --- | --- | --- | --- | --- |
|  | Undercoat layer | Adhesive layer | Undercoat layer | Adhesive layer | Undercoat layer | Adhesive layer |
| BEAMSET 750[*15] | 35 |  | 35 |  |  |  |
| KAYARAD R-712[*16] |  |  |  |  |  |  |
| Component B |  |  |  |  |  |  |
| Amine compound |  |  |  |  |  |  |
| Dibutylamine |  |  |  |  |  |  |
| Ethylenediamine |  |  |  |  |  |  |
| TOMIDE 252[*25] |  |  |  |  |  |  |
| FUJICURE 5100[*26] |  |  |  |  |  |  |
| Aniline |  |  |  |  |  |  |
| Pyridine |  |  |  |  |  |  |
| Tetramethylthiourea |  |  |  |  |  |  |
| Polymerizable monomer |  |  |  |  |  |  |
| 4-vinylpyridine | 8 |  | 8 |  |  |  |
| Acrylamide |  |  |  |  |  |  |
| N-vinylpyrrohidone |  |  |  | 18 |  |  |
| Vulcanization accelerator |  |  |  |  |  |  |
| Diphenylguanidine |  |  |  |  |  |  |
| 2-methylimidazole |  |  |  |  |  |  |
| Component C or F |  |  |  |  |  |  |
| KAYARAD THE-330[*17] |  |  |  |  |  |  |
| KAYARAD TPA-320[*18] |  |  |  |  |  |  |
| KAYARAD TPA-330[*19] |  |  |  |  |  |  |
| BEAMSET 710[*20] | 20 | 12 | 20 | 12 |  |  |
| BEAMSET 700[*21] |  |  |  |  | 25 | 18 |
| Epoxy compound |  |  |  |  |  |  |
| ENA[*6] | 10 |  | 10 |  | 10 |  |
| High-molecular filler |  |  |  |  |  |  |
| HYCAR ATBN[*5] 1300 × 16 |  |  |  |  | 5 |  |
| ISOBAN 10[*7] | 12 |  | 12 |  |  |  |
| VIRON 300[*27] |  |  |  |  |  |  |
| Inorganic filler |  |  |  |  |  |  |
| NANOMER PGW[*22] |  |  |  |  | 3 | 3 |
| Photoinitiator |  |  |  |  |  |  |
| KAYACURE DETX-S[*23] |  |  |  |  |  |  |
| KAYACURE DMBI[*24] | 3 | 3 | 3 | 3 | 2 | 2 |
| Adherend | Polyester film | | Polyester film | | Polyester film | |
| Radiation conditions |  |  |  |  |  |  |
| UV exposure (mJ/cm$^2$) | 500 | 500 | 500 | 500 | 1000 | 1000 |
| UV exposure time (s) | 5 | 5 | 5 | 5 | 10 | 10 |
| EB exposure (MRad) | 0 | 0 | 0 | 0 | 0 | 0 |
| Results of film peel test |  |  |  |  |  |  |
| Peel strength (N/25 mm) |  | 6 |  | 254 |  | 13 |
| Rubber adhesion |  | E |  | A+ |  | E |
| Results of cord tensile test |  |  |  |  |  |  |
| Cord tension (N/cord) |  | — |  | — |  | — |
| Rubber adhesion |  | — |  | — |  | — |
| Results of differential scanning calorimetry |  |  |  |  |  |  |
| Heat-of-reaction peak tomp. (° C.) |  | — |  | — |  | — |
| Analysis by scanning electron microscope-X-ray analyzer |  |  |  |  |  |  |
| Sulfur content in adhesive composition layer |  | — |  | — |  | — |

TABLE 1-7

|  | Ex. 14 | | Com. Ex. 6 | | Ex. 15 | |
| --- | --- | --- | --- | --- | --- | --- |
|  | Undercoat layer | Adhesive layer | Undercoat layer | Adhesive layer | Undercoat layer | Adhesive layer |
| Component A | | | | | | |
| RIACRYL 3801[*1] | 5 | 42 | | | | |
| RIACRYL 3500[*2] | | | 10 | 60 | 10 | 42 |
| RIACRYL 3100[*3] | | | | | | |
| BAC45[*4] | | | | | | |
| Component D | | | | | | |
| Monofunctional compound | | | | | | |
| SR-285[*8] | | | | | | |
| SR-440[*9] | 10 | 5 | | | 10 | |
| AMP-60G[*10] | | | | | | |
| Styrene | | | 10 | 3 | | |
| Polyfunctional compound | | | | | | |
| 9PG[*11] | | | 14 | | 14 | |
| APG-400[*12] | 8 | 15 | | 15 | | 20 |
| Component E | | | | | | |
| SR-348[*13] | | | | | | |
| KAYARAD R551[*14] | 32 | | | | 18 | |
| BEAMSET 750[*15] | | | | | | |
| KAYARAD R-712[*18] | | | 36 | | 18 | |
| Component B | | | | | | |
| Amine compound | | | | | | |
| Dibutylamine | | | | | 4 | 23 |
| Ethylenediamine | | 15 | | | | |
| TOMIDE 252[*25] | | | | | | |
| FUJICURE 5100[*26] | | | | | | |
| Aniline | | | | | | |
| Pyridine | | | | | | |
| Tetramethylthiourea | | | | | | |
| Polymerizable monomer | | | | | | |
| 4-vinylpyridine | | | | 4 | | |
| Acrylamide | | | | | | |
| N-vinylpyrrolidone | | | | | | |
| Vulcanization accelerator | | | | | | |
| Diphenylguanidine | | | | | | |
| 2-methylimidazole | | | | | | |
| Component C or F | | | | | | |
| KAYARAD THE-330[*17] | | | | 8 | | 8 |
| KAYARAD TPA-320[*18] | | | 12 | | 12 | |
| KAYARAD TPA-330[*19] | | | 6 | | 6 | 5 |
| BEAMSET 710[*20] | | | | | | |
| BEAMSET 700[*21] | 25 | 18 | | | | |
| Epoxy compound | | | | | | |
| ENA[*6] | 10 | | 6 | | 6 | |
| High-molecular filler | | | | | | |
| HYCAR ATBN[*5] 1300 × 16 | 5 | | | 10 | | |
| ISOBAN 10[*7] | | | | | | |
| VIRON 300[*27] | | | | | | |
| Inorganic filler | | | | | | |
| NANOMER PGW[*22] | 3 | 3 | | 2 | | |
| Photoinitiator | | | | | | |
| KAYACURE DETX-S[*23] | | | 2 | 2 | 2 | 2 |
| KAYACURE DMBI[*24] | 2 | 2 | | | | |
| Adherend | Polyester film | | Polyester film | | Polyester film | |
| Radiation conditions | | | | | | |
| UV exposure (mJ/cm²) | 1000 | 1000 | 1000 | 500 | 1000 | 500 |
| UV exposure time (s) | 10 | 10 | 10 | 5 | 10 | 5 |
| EB exposure (MRad) | 0 | 0 | 0 | 0 | 0 | 0 |
| Results of film peel test | | | | | | |
| Peel strength (N/25 mm) | 190 | | 22 | | 178 | |
| Rubber adhesion | B | | E | | B | |

TABLE 1-7-continued

|  | Ex. 14 | | Com. Ex. 6 | | Ex. 15 | |
| --- | --- | --- | --- | --- | --- | --- |
|  | Undercoat layer | Adhesive layer | Undercoat layer | Adhesive layer | Undercoat layer | Adhesive layer |
| Results of cord tensile test | | | | | | |
| Cord tension (N/cord) | — | | — | | — | |
| Rubber adhesion | — | | — | | — | |
| Results of differential scanning calorimetry | | | | | | |
| Heat-of-reaction peak temp. (° C.) | 156° C. | | — | | 159° C. | |
| Analysis by scanning electron microscope-X-ray analyzer | | | | | | |
| Sulfur content in adhesive composition | Higher than rubber layer | | — | | Higher than rubber layer | |

TABLE 1-8

|  | Ex. 16 | | Ex. 17 | | Ex. 18 | |
| --- | --- | --- | --- | --- | --- | --- |
|  | Undercoat layer | Adhesive layer | Undercoat layer | Adhesive layer | Undercoat layer | Adhesive layer |
| Component A | | | | | | |
| RIACRYL 3801[*1] | | | | | | |
| RIACRYL 3500[*2] | 10 | 45 | 10 | 45 | 10 | 45 |
| RIACRYL 3100[*3] | | | | | | |
| BAC45[*d] | | | | | | |
| Component D | | | | | | |
| Monofunctional compound | | | | | | |
| SR-285[*8] | | | | | | |
| SR-440[*9] | | | 10 | 3 | 10 | 3 |
| AMP-60G[*10] | | | | | | |
| Styrene | 10 | 3 | | | | |
| Polyfunctional compound | | | | | | |
| 9PG[*11] | 14 | | 14 | | 14 | |
| APG-400[*12] | | 15 | | 15 | | 15 |
| Component E | | | | | | |
| SR-348[*13] | | | | | | |
| KAYARAD R551[*14] | 18 | | 18 | | 18 | |
| BEAMSET 750[*15] | | | | | | |
| KAYARAD R-712[*16] | | 18 | | 18 | | 18 |
| Component B | | | | | | |
| Amine compound | | | | | | |
| Dibutylamino | | | | | | |
| Ethylenediamine | | | | | | |
| TOMIDE 252[*25] | | | | | | |
| FUJICURE 5100[*26] | 4 | | | | | |
| Aniline | | 15 | | 20 | | |
| Pyridine | | | | | | |
| Tetramethylthiourea | | | | | | |
| Polymerizable monomer | | | | | | |
| 4-vinylpyridine | | | 4 | | | |
| Acrylamide | | | | | | |
| N-vinylpyrrolidone | | | | | 4 | |
| Vulcanization accelerator | | | | | | |
| Diphenylguanidine | | | | | | 15 |
| 2-methylimidazole | | | | | | |
| Component C or F | | | | | | |
| KAYARAD THE-330[*17] | | 8 | | 8 | | 8 |
| KAYARAD TPA-320[*18] | 12 | | 12 | | 12 | |

TABLE 1-8-continued

|  | Ex. 16 | | Ex. 17 | | Ex. 18 | |
| --- | --- | --- | --- | --- | --- | --- |
|  | Undercoat layer | Adhesive layer | Undercoat layer | Adhesive layer | Undercoat layer | Adhesive layer |
| KAYARAD TPA-330*[19] | 6 | | 6 | | 6 | |
| BEAMSET 710*[20] | | | | | | |
| BEAMSET 700*[21] | | | | | | |
| Epoxy compound | | | | | | |
| ENA*[6] | 6 | | 6 | | 6 | |
| High-molecular filler | | | | | | |
| HYCAR ATBN*[5] 1300 × 16 | | 10 | | 5 | | 10 |
| ISOBAN 10*[7] | | | | | | |
| VIRON 300*[27] | | | | | | |
| Inorganic filler | | | | | | |
| NANOMER PGW*[22] | | 2 | | 2 | | 2 |
| Photoinitiator | | | | | | |
| KAYACURE DETX-S*[23] | 2 | 2 | 2 | 2 | 2 | 2 |
| KAYACURE DMBI*[24] | | | | | | |
| Adherend | Polyester film | | Polyester film | | Polyester film | |
| Radiation conditions | | | | | | |
| UV exposure (mJ/cm$^2$) | 1000 | 500 | 1000 | 500 | 1000 | 500 |
| UV exposure time (s) | 10 | 5 | 10 | 5 | 10 | 5 |
| EB exposure (MRad) | 0 | 0 | 0 | 0 | 0 | 0 |
| Results of film peel test | | | | | | |
| Peel strength (N//25 mm) | | 159 | | 204 | | 188 |
| Rubber adhesion | | C | | B | | B |
| Results of cord tensile test | | | | | | |
| Cord tension (N/cord) | | — | | — | | — |
| Rubber adhesion | | — | | — | | — |
| Results of differential scanning calorimetry | | | | | | |
| Heat-of-reaction peak temp. (° C.) | | — | | — | | — |
| Analysis by scanning electron microscope-X-ray analyzer | | | | | | |
| Sulfur content in adhesive composition layer | | Higher than rubber layer | | Higher than rubber layer | | — |

TABLE 1-9

|  | Ex. 19 | | Ex. 20 | | Ex. 21 | |
| --- | --- | --- | --- | --- | --- | --- |
|  | Undercoat layer | Adhesive layer | Undercoat layer | Adhesive layer | Undercoat layer | Adhesive layer |
| Component A | | | | | | |
| RIACRYL 3801*[1] | | | | | | |
| RIACRYL 3500*[2] | 10 | 45 | 10 | 45 | 10 | 45 |
| RIACRYL 3100*[3] | | | | | | |
| BAC45*[4] | | | | | | |
| Component D | | | | | | |
| Monofunctional compound | | | | | | |
| SR-285*[8] | | | | | | |
| SR-440*[9] | 10 | 3 | 10 | 3 | 10 | 3 |
| AMP-60G*[10] | | | | | | |
| Styrene | | | | | | |
| Polyfunctional compound | | | | | | |
| 9PG*[11] | 14 | | 14 | | 14 | |
| APG-400*[12] | | 15 | | 15 | | 15 |

TABLE 1-9-continued

|  | Ex. 19 | | Ex. 20 | | Ex. 21 | |
| --- | --- | --- | --- | --- | --- | --- |
|  | Undercoat layer | Adhesive layer | Undercoat layer | Adhesive layer | Undercoat layer | Adhesive layer |
| Component E |  |  |  |  |  |  |
| SR-348*13 |  |  |  |  |  |  |
| KAYARAD R551*14 | 18 |  | 18 |  | 18 |  |
| BEAMSET 750*15 |  |  |  |  |  |  |
| KAYARAD R-712*16 | 18 |  | 18 |  | 18 |  |
| Component B |  |  |  |  |  |  |
| Amine compound |  |  |  |  |  |  |
| Dibutylamine |  |  |  |  |  |  |
| Ethylenediamine |  |  |  |  |  |  |
| TOMIDE 252*25 |  |  |  |  |  |  |
| FUJICURE 5100*26 |  |  |  |  |  |  |
| Aniline |  |  |  |  |  |  |
| Pyridine |  |  |  |  |  |  |
| Tetramethylthiourea |  | 15 |  |  |  |  |
| Polymerizable monomer |  |  |  |  |  |  |
| 4-vinylpyridine |  |  |  |  |  |  |
| Acrylamide |  |  |  |  | 4 | 15 |
| N-vinylpyrrolidone |  |  |  |  |  |  |
| Vulcanization accelerator |  |  |  |  |  |  |
| Diphenylguanidine | 4 |  |  |  |  |  |
| 2-methylimidazole |  |  | 4 | 15 |  |  |
| Component C or F |  |  |  |  |  |  |
| KAYARAD THE-330*17 |  | 8 |  | 8 |  | 8 |
| KAYARAD TPA-320*18 | 12 |  | 12 |  | 12 |  |
| KAYARAD TPA-330*19 | 6 |  | 6 |  | 6 |  |
| BEAMSET 710*20 |  |  |  |  |  |  |
| BEAMSET 700*21 |  |  |  |  |  |  |
| Epoxy compound |  |  |  |  |  |  |
| ENA*6 | 6 |  | 6 |  | 6 |  |
| High-molecular filler |  |  |  |  |  |  |
| HYCAR ATBN*5 1300 × 16 |  | 10 |  | 10 |  | 10 |
| ISOBAN 10*7 |  |  |  |  |  |  |
| VIRON 300*27 |  |  |  |  |  |  |
| Inorganic filler |  |  |  |  |  |  |
| NANOMER PGW*22 |  | 2 |  | 2 |  | 2 |
| Photoinitiator |  |  |  |  |  |  |
| KAYACURE DETX-S*23 | 2 | 2 | 2 | 2 | 2 | 2 |
| KAYACURE DMBI*24 |  |  |  |  |  |  |
| Adherend | Polyester film | | Polyester film | | Polyester film | |
| Radiation conditions |  |  |  |  |  |  |
| UV exposure (mJ/cm²) | 1000 | 500 | 1000 | 500 | 1000 | 500 |
| UV exposure time (s) | 10 | 5 | 10 | 5 | 10 | 5 |
| EB exposure (MRad) | 0 | 0 | 0 | 0 | 0 | 0 |
| Results of film peel test |  |  |  |  |  |  |
| Peel strength (N/25 mm) | 147 | | 152 | | 227 | |
| Rubber adhesion | C | | C | | A | |
| Results of cord tensile test |  |  |  |  |  |  |
| Cord tension (N/cord) | — | | — | | — | |
| Rubber adhesion | — | | — | | — | |
| Results of differential scanning calorimetry |  |  |  |  |  |  |
| Heat-of-reaction peak temp. (° C.) | — | | — | | — | |
| Analysis by scanning electron microscope-X-ray analyzer |  |  |  |  |  |  |
| Sulfur content in adhesive composition layer | Higher than rubber layer | | Higher than rubber layer | | Higher than rubber layer | |

TABLE 1-10

|  | Ex. 22 | | Com. Ex. 7 | | Ex. 23 | |
| --- | --- | --- | --- | --- | --- | --- |
|  | Undercoat layer | Adhesive layer | Undercoat layer | Adhesive layer | Undercoat layer | Adhesive layer |
| Component A | | | | | | |
| RIACRYL 3801*1 | | | | | | |
| RIACRYL 3500*2 | 10 | 45 | 10 | 54 | 10 | 54 |
| RIACRYL 3100*3 | | | | | | |
| BAC45*4 | | | | | | |
| Component D | | | | | | |
| Monofunctional compound | | | | | | |
| SR-285*8 | | | | | | |
| SR-440*9 | 10 | 3 | 10 | | 10 | |
| AMP-60G*10 | | | | | | |
| Styrene | | | | 23 | | |
| Polyfunctional compound | | | | | | |
| 9PG*11 | 14 | | | | | |
| APG-400*12 | | 15 | 14 | 14 | 14 | 14 |
| Component E | | | | | | |
| SR-348*13 | | | | | | |
| KAYARAD R551*14 | 18 | | 18 | | 18 | |
| BEAMSET 750*15 | | | | | | |
| KAYARAD R-712*16 | 18 | | 18 | | 18 | |
| Component B | | | | | | |
| Amine compound | | | | | | |
| Dibutylamine | | | | | | |
| Ethylenediamine | | | | | | |
| TOMIDE 252*25 | | | | | | |
| FUJICURE 5100*26 | | | | | | |
| Aniline | | | | | | |
| Pyridine | | | | | | |
| Tetramethylthiourea | | | | | | |
| Polymerizable monomer | | | | | | |
| 4-vinylpyridine | | | | | | 23 |
| Acrylamide | | | | | | |
| N-vinylpyrrolidone | 4 | 15 | 4 | | 4 | |
| Vulcanization accelerator | | | | | | |
| Diphenylguanidine | | | | | | |
| 2-methylimidazole | | | | | | |
| Component C or F | | | | | | |
| KAYARAD THE-330*17 | | 8 | | | | |
| KAYARAD TPA-320*18 | 12 | | 12 | 6 | 12 | 6 |
| KAYARAD TPA-330*19 | 6 | | 6 | | 6 | |
| BEAMSET 710*20 | | | | | | |
| BEAMSET 700*21 | | | | | | |
| Epoxy compound | | | | | | |
| ENA*6 | 6 | | 6 | | 6 | |
| High-molecular filler | | | | | | |
| HYCAR ATBN*5 1300 × 16 | | 10 | | | | |
| ISOBAN 10*7 | | | | | | |
| VIRON 300*27 | | | | | | |
| Inorganic filler | | | | | | |
| NANOMER PGW*22 | | 2 | | | | |
| Photoinitiator | | | | | | |
| KAYACURE DETX-S*23 | 2 | 2 | 2 | 3 | 2 | 3 |
| KAYACURE DMBI*24 | | | | | | |
| Adherend | Polyester film | | Polyester film | | Polyester film | |
| Radiation conditions | | | | | | |
| UV exposure (mJ/cm²) | 1000 | 500 | 1000 | 500 | 1000 | 500 |
| UV exposure time (sec) | 10 | 5 | 10 | 5 | 10 | 5 |
| EB exposure (MRad) | 0 | 0 | 0 | 0 | 0 | 0 |
| Results of film peel test | | | | | | |
| Peel strength (N/25 mm) | 208 | | 15 | | 229 | |
| Rubber adhesion | A | | E | | A | |

TABLE 1-10-continued

|  | Ex. 22 | | Com. Ex. 7 | | Ex. 23 | |
| --- | --- | --- | --- | --- | --- | --- |
|  | Undercoat layer | Adhesive layer | Undercoat layer | Adhesive layer | Undercoat layer | Adhesive layer |
| Results of cord tensile test | | | | | | |
| Cord tension (N/cord) | — | | — | | — | |
| Rubber adhesion | — | | — | | — | |
| Results of differential scanning calorimetry | | | | | | |
| Heat-of-reaction peak temp. (° C.) | — | | — | | — | |
| Analysis by scanning electron microscope-X-ray analyzer | | | | | | |
| Sulfur content in adhesive composition layer | — | | — | | — | |

TABLE 1-11

|  | Com. Ex. 8 | | Ex. 24 | | Ex. 25 | |
| --- | --- | --- | --- | --- | --- | --- |
|  | Undercoat layer | Adhesive layer | Undercoat layer | Adhesive layer | Undercoat layer | Adhesive layer |
| Component A | | | | | | |
| RIACRYL 3801[*1] | | | | | | |
| RIACRYL 3500[*2] | 10 | 53 | 10 | 53 | 10 | 53 |
| RIACRYL 3100[*3] | | | | | | |
| BAC45[*4] | | | | | | |
| Component D | | | | | | |
| Monofunctional compound | | | | | | |
| SR-285[*8] | | 5 | | 4 | | 3 |
| SR-440[*9] | 10 | | 10 | | 10 | 5 |
| AMP-60G[*10] | | | | | | |
| Styrene | | 14 | | 8 | | 6 |
| Polyfunctional compound | | | | | | |
| 9PG[*11] | | | | | | |
| APG-400[*12] | 14 | 14 | 14 | 14 | 14 | 14 |
| Component E | | | | | | |
| SR-348[*13] | | | | | | |
| KAYARAD R551[*14] | 18 | | 18 | | 18 | |
| BEAMSET 750[*15] | | | | | | |
| KAYARAD R-712[*16] | 18 | | 18 | | 18 | |
| Component B | | | | | | |
| Amine compound | | | | | | |
| Dibutylamine | | | | | | |
| Ethylenediamine | | | | | | |
| TOMIDE 252[*25] | | | | | | |
| FUJICURE 5100[*26] | | | | | | |
| Aniline | | | | | | |
| Pyridine | | | | | | |
| Tetramethylthiourea | | | | | | |
| Polymerizable monomer | | | | | | |
| 4-vinylpyridine | | | | 6 | | 10 |
| Acrylamide | | | | | | |
| N-vinylpyrrolidone | 4 | | 4 | | 4 | |
| Vulcanization accelerator | | | | | | |
| Diphenylguanidine | | | | | | |
| 2-methylimidazole | | | | | | |
| Component C or F | | | | | | |
| KAYARAD THE-330[*17] | | | | | | |
| KAYARAD TPA-320[*18] | 12 | 6 | 12 | 6 | 12 | 6 |
| KAYARAD TPA-330[*19] | 6 | | 6 | | 6 | |

TABLE 1-11-continued

| | Com. Ex. 8 | | Ex. 24 | | Ex. 25 | |
|---|---|---|---|---|---|---|
| | Undercoat layer | Adhesive layer | Undercoat layer | Adhesive layer | Undercoat layer | Adhesive layer |
| BEAMSET 710[*20] | | | | | | |
| BEAMSET 700[*21] | | | | | | |
| Epoxy compound | | | | | | |
| ENA[*6] | 6 | 5 | 6 | 6 | 6 | |
| High-molecular filler | | | | | | |
| HYCAR ATBN[*6] 1300 × 16 | | | | | | |
| ISOBAN 10[*7] | | | | | | |
| VIRON 300[*27] | | | | | | |
| Inorganic filler | | | | | | |
| NANOMER PGW[*22] | | | | | | |
| Photoinitiator | | | | | | |
| KAYACURE DETX-S[*23] | 2 | 3 | 2 | 3 | 2 | 3 |
| KAYACURE DMBI[*24] | | | | | | |
| Adherend | Polyester film | | Polyester film | | Polyester film | |
| Radiation conditions | | | | | | |
| UV exposure (mJ/cm$^2$) | 1000 | 500 | 1000 | 500 | 1000 | 500 |
| UV exposure time (s) | 10 | 5 | 10 | 5 | 10 | 5 |
| EB exposure (MRad) | 0 | 0 | 0 | 0 | 0 | 0 |
| Results of film peel test | | | | | | |
| Peel strength (N/25 mm) | | 14 | | 100 | | 259 |
| Rubber adhesion | | E | | C | | A+ |
| Results of cord tensile test | | | | | | |
| Cord tension (N/cord) | | — | | — | | — |
| Rubber adhesion | | — | | — | | — |
| Results or differential scanning calorimetry | | | | | | |
| Heat-of-reaction peak temp. (° C.) | | — | | 167 | | 160 |
| Analysis by scanning electron microscope-X-ray analyzer | | | | | | |
| Sulfur content in adhesive composition layer | | — | | Higher than rubber layer | | Higher than rubber layer |

TABLE 1-12

| | Ex. 26 | | Ex. 27 | | Ex. 28 | |
|---|---|---|---|---|---|---|
| | Undercoat layer | Adhesive layer | Undercoat layer | Adhesive layer | Undercoat layer | Adhesive layer |
| Component A | | | | | | |
| RIACRYL 3801[*1] | | | | | | |
| RIACRYL 3500[*2] | 10 | 53 | 10 | 38 | 10 | 29 |
| RIACRYL 3100[*3] | | | | | | |
| BAC45[*4] | | | | | | |
| Component D | | | | | | |
| Monofunctional compound | | | | | | |
| SR-285[*8] | | | | | | |
| SR-440[*9] | 10 | | 10 | | 10 | |
| AMP-60G[*10] | | 4 | | | | |
| Styrene | | 3 | | | | |
| Polyfunctional compound | | | | | | |
| 9PG[*11] | | | | | | |
| APG-400[*12] | 14 | 14 | 14 | 14 | 14 | 10 |
| Component E | | | | | | |
| SR-348[*13] | | | | | | |
| KAYARAD R551[*14] | 18 | | 18 | | 18 | |

TABLE 1-12-continued

|  | Ex. 26 | | Ex. 27 | | Ex. 28 | |
| --- | --- | --- | --- | --- | --- | --- |
|  | Undercoat layer | Adhesive layer | Undercoat layer | Adhesive layer | Undercoat layer | Adhesive layer |
| BEAMSET 750[*15] | | | | | | |
| KAYARAD R-712[*16] | 18 | | 18 | | 18 | |
| Component B | | | | | | |
| Amine compound | | | | | | |
| Dibutylamine | | | | | | |
| Ethylenediamine | | | | | | |
| TOMIDE 252[*25] | | | | | | |
| FUJICURE 5100[*26] | | | | | | |
| Aniline | | | | | | |
| Pyridine | | | | | | |
| Tetramethylthiourea | | | | | | |
| Polymerizable monomer | | | | | | |
| 4-vinylpyridine | | 14 | | 39 | | 53 |
| Acrylamide | | | | | | |
| N-vinylpyrrolidone | 4 | | 4 | | 4 | |
| Vulcanization accelerator | | | | | | |
| Diphenylguanidine | | | | | | |
| 2-methylimidazole | | | | | | |
| Component C or F | | | | | | |
| KAYARAD THE-330[*17] | | | | | | |
| KAYARAD TPA-320[*18] | 12 | 6 | 12 | 6 | 12 | 5 |
| KAYARAD TPA-330[*19] | 6 | | 6 | | 6 | |
| BEAMSET 710[*20] | | | | | | |
| BEAMSET 700[*21] | | | | | | |
| Epoxy compound | | | | | | |
| ENA[*6] | 6 | 3 | 6 | | 6 | |
| High-molecular filler | | | | | | |
| HYCAR ATBN[*5] 1300 × 16 | | | | | | |
| ISOBAN 10[*7] | | | | | | |
| VIRON 300[*27] | | | | | | |
| Inorganic filler | | | | | | |
| NANOMER PGW[*22] | | | | | | |
| Photopolymerization initiator | | | | | | |
| KAYACURE DETX-S[*23] | 2 | 3 | 2 | 3 | 2 | 3 |
| KAYACURE DMBI[*24] | | | | | | |
| Adherend | Polyester film | | Polyester film | | Polyester film | |
| Radiation conditions | | | | | | |
| UV exposure (mJ/cm²) | 1000 | 500 | 1000 | 500 | 1000 | 500 |
| UV exposure time (s) | 10 | 5 | 10 | 5 | 10 | 5 |
| EB exposure (MRad) | 0 | 0 | 0 | 0 | 0 | 0 |
| Results of film peel test | | | | | | |
| Peel strength (N/25 mm) | | 245 | | 233 | | 162 |
| Rubber adhesion | | A | | A | | B |
| Results of cord tensile test | | | | | | |
| Cord tension (N/cord) | | — | | — | | — |
| Rubber adhesion | | | | | | |
| Results of differential scanning calorimetry | | | | | | |
| Heat-of-reaction peak temp. (° C.) | | — | | 144 | | — |
| Analysis by scanning electron microscope-X-ray analyzer | | | | | | |
| Sulfur content in adhesive composition layer | | — | | Higher than rubber layer | | — |

TABLE 1-13

| | Com. Ex. 9 | | Ex. 29 | | Ex. 30 | |
|---|---|---|---|---|---|---|
| | Undercoat layer | Adhesive layer | Undercoat layer | Adhesive layer | Undercoat layer | Adhesive layer |
| Component A | | | | | | |
| RIACRYL 3801[*1] | | | | | | |
| RIACRYL 3500[*2] | 10 | | 10 | 44 | 10 | 44 |
| RIACRYL 3100[*3] | | | | | | |
| BAC45[*4] | | | | | | |
| Component D | | | | | | |
| Monofunctional compound | | | | | | |
| SR-285[*8] | | | | | | |
| SR-440[*9] | 10 | | 10 | | 10 | |
| AMP-60G[*10] | | | | | | |
| Styrene | | | | | | |
| Polyfunctional compound | | | | | | |
| 9PG[*11] | | | | | | |
| APG-400[*12] | 14 | | 14 | 14 | 14 | 14 |
| Component E | | | | | | |
| SR-348[*13] | | | | | | |
| KAYARAD R551[*14] | 18 | | 18 | | 18 | |
| BEAMSET 750[*15] | | | | | | |
| KAYARAD R-712[*16] | 18 | | 18 | | 18 | |
| Component B | | | | | | |
| Amine compound | | | | | | |
| Dibutylamine | | | | | | |
| Ethylenediamine | | | | | | |
| TOMIDE 252[*25] | | | | | | |
| FUJICURE 5100[*26] | | | | | | |
| Aniline | | | | | | |
| Pyridine | | | | | 10 | | 10 |
| Tetramethylthiourea | | | | | | |
| Polymerizable monomer | | | | | | |
| 4-vinylpyridine | | 100 | | 23 | | 23 |
| Acrylamide | | | | | | |
| N-vinylpyrrolidone | 4 | | 4 | | 4 | |
| Vulcanization accelerator | | | | | | |
| Diphenylguanidine | | | | | | |
| 2-methylimidazole | | | | | | |
| Component C or F | | | | | | |
| KAYARAD THE-330[*17] | | | | | | |
| KAYARAD TPA-320[*18] | 12 | | 12 | 6 | 12 | 6 |
| KAYARAD TPA-330[*19] | 6 | | 6 | | 6 | |
| BEAMSET 710[*20] | | | | | | |
| BEAMSET 700[*21] | | | | | | |
| Epoxy compound | | | | | | |
| ENA[*6] | 6 | | 6 | | 6 | |
| High-molecular filler | | | | | | |
| HYCAR ATBN[*5] 1300 × 16 | | | | | | |
| ISOBAN 10[*7] | | | | | | |
| VIRON 300[*27] | | | | | | |
| Inorganic filler | | | | | | |
| NANOMER PGW[*22] | | | | | | |
| Photoinitiator | | | | | | |
| KAYACURE DETX-S[*23] | 2 | | 2 | 3 | 2 | 3 |
| KAYACURE DMBI[*24] | | | | | | |
| Adherend | Polyester film | | Polyester film | | Polyester film | |
| Radiation conditions | | | | | | |
| UV exposure (mJ/cm²) | 1000 | 500 | 0 | 0 | 0 | 0 |
| UV exposure time (s) | 10 | 5 | 0 | 0 | 0 | 0 |
| EB exposure (MRad) | 0 | 0 | 40 | 20 | 40 | 15 |
| Results of film peel test | | | | | | |
| Peel strength (N/25 mm) | 13 | | 231 | | 224 | |
| Rubber adhesion | E | | A | | A | |

TABLE 1-13-continued

|  | Com. Ex. 9 | | Ex. 29 | | Ex. 30 | |
| --- | --- | --- | --- | --- | --- | --- |
|  | Undercoat layer | Adhesive layer | Undercoat layer | Adhesive layer | Undercoat layer | Adhesive layer |
| Results of cord tensile test | | | | | | |
| Cord tension (N/cord) | — | | — | | — | |
| Rubber adhesion | — | | — | | — | |
| Results of differential scanning calorimetry | | | | | | |
| Heat-of-reaction peak temp. (° C.) | — | | — | | — | |
| Analysis by scanning electron microscope-X-ray analyzer | | | | | | |
| Sulfur content in adhesive composition layer | — | | — | | — | |

TABLE 1-14

|  | Ex. 31 | | EX. 32 | | Ex. 33 | |
| --- | --- | --- | --- | --- | --- | --- |
|  | Undercoat layer | Adhesive layer | Undercoat layer | Adhesive layer | Undercoat layer | Adhesive layer |
| Component A | | | | | | |
| RIACRYL 3801[*1] | | | | | | |
| RIACRYL 3500[*2] | 10 | 47 | 10 | 47 | 10 | 47 |
| RIACRYL 3100[*3] | | | | | | |
| BAC45[*4] | | | | | | |
| Component D | | | | | | |
| Monofunctional compound | | | | | | |
| SR-285[*8] | | | | | | |
| SR-440[*9] | 10 | | 10 | | 10 | |
| AMP-60G[*10] | | | | | | |
| Styrene | | | | | | |
| Polyfunctional compound | | | | | | |
| 9PG[*11] | | | | | | |
| APG-400[*12] | 14 | 14 | 14 | 14 | 14 | 14 |
| Component E | | | | | | |
| SR-348[*13] | | | | | | |
| KAYARAD R551[*14] | 18 | | 18 | | 18 | |
| BEAMSET 750[*15] | | | | | | |
| KAYARAD R-712[*16] | 18 | | 18 | | 18 | |
| Component B | | | | | | |
| Amine compound | | | | | | |
| Dibutylamine | | | | | | |
| Ethylenediamine | | | | | | |
| TOMIDE 252[*25] | | | | | | |
| FUJICURE 5100[*26] | | | | | | |
| Aniline | | | | | | |
| Pyridine | | 10 | | 10 | | 10 |
| Tetramethylthiourea | | | | | | |
| Polymerizable monomer | | | | | | |
| 4-vinylpyridine | | 23 | | 23 | | 23 |
| Acrylamide | | | | | | |
| N-vinylpyrrolidone | 4 | | 4 | | 4 | |
| Vulcanization accelerator | | | | | | |
| Diphenylguanidine | | | | | | |
| 2-methylimidazole | | | | | | |
| Component C or F | | | | | | |
| KAYARAD THE-330[*17] | | | | | | |
| KAYARAD TPA-320[*18] | 12 | 6 | 12 | 6 | 12 | 6 |

TABLE 1-14-continued

|  | Ex. 31 | | EX. 32 | | Ex. 33 | |
| --- | --- | --- | --- | --- | --- | --- |
|  | Undercoat layer | Adhesive layer | Undercoat layer | Adhesive layer | Undercoat layer | Adhesive layer |
| KAYARAD TPA-330*[19] | 6 | | 6 | | 6 | |
| BEAMSET 710*[20] | | | | | | |
| BEAMSET 700*[21] | | | | | | |
| Epoxy compound | | | | | | |
| ENA*[6] | 8 | | 8 | | 8 | |
| High-molecular filler | | | | | | |
| HYCAR ATBN*[5] 1300 × 16 | | | | | | |
| ISOBAN 10*[7] | | | | | | |
| VIRON 300*[27] | | | | | | |
| Inorganic filler | | | | | | |
| NANOMER PGW*[22] | | | | | | |
| Photoinitiator | | | | | | |
| KAYACURE DETX-S*[27] | | | | | | |
| KAYACURE DMBI*[24] | | | | | | |
| Adherend | Polyester film | | Polyester film | | Polyester film | |
| Radiation conditions | | | | | | |
| UV exposure (mJ/cm$^2$) | 1000 | 0 | 1000 | 0 | 0 | 0 |
| UV exposure time (s) | 10 | 0 | 10 | 0 | 0 | 0 |
| EB exposure (MRad) | 0 | 15 | 0 | 7 | 25 | 7 |
| Results of film peel test | | | | | | |
| Peel strength (N/25 mm) | | 239 | | 215 | | 244 |
| Rubber adhesion | | A | | A | | A |
| Results of cord tensile test | | | | | | |
| Cord tension (N/cord) | | — | | — | | — |
| Rubber adhesion | | — | | — | | — |
| Results of differential scanning calorimetry | | | | | | |
| Heat-of-reaction peak temp. (° C.) | | — | | — | | — |
| Analysis by scanning electron microscope-X-ray analyzer | | | | | | |
| Sulfur content in adhesive composition | | — | | — | | — |

TABLE 1-15

|  | Com. Ex. 10 | | Com. Ex. 11 | | Ex. 34 | |
| --- | --- | --- | --- | --- | --- | --- |
|  | Undercoat layer | Adhesive layer | Undercoat layer | Adhesive layer | Undercoat layer | Adhesive layer |
| Component A | | | | | | |
| RIACRYL 3801*[1] | | | | | | |
| RIACRYL 3500*[2] | 10 | | 10 | 47 | | |
| RIACRYL 3100*[3] | | | | | 10 | 54 |
| BAC45*[4] | | | | | | |
| Component D | | | | | | |
| Monofunctional compound | | | | | | |
| SR-285*[8] | | | | | | |
| SR-440*[9] | 10 | 44 | 10 | 30 | 10 | |
| AMP-60G*[10] | | | | | | |
| Styrene | | | | | | |
| Polyfunctional compound | | | | | | |
| 9PG*[11] | | | | | | |
| APG-400*[12] | 14 | 14 | 14 | 14 | 14 | 14 |

TABLE 1-15-continued

|  | Com. Ex. 10 | | Com. Ex. 11 | | Ex. 34 | |
| --- | --- | --- | --- | --- | --- | --- |
|  | Undercoat layer | Adhesive layer | Undercoat layer | Adhesive layer | Undercoat layer | Adhesive layer |
| Component E |  |  |  |  |  |  |
| SR-348*[13] |  |  |  |  |  |  |
| KAYARAD R551*[14] | 18 |  | 18 |  | 18 |  |
| BEAMSET 750*[15] |  |  |  |  |  |  |
| KAYARAD R-712*[16] | 18 |  | 18 |  | 18 |  |
| Component B |  |  |  |  |  |  |
| Amine compound |  |  |  |  |  |  |
| Dibutylamine |  |  |  |  |  |  |
| Ethylenediamine |  |  |  |  |  |  |
| TOMIDE 252*[25] |  |  |  |  |  |  |
| FUJICURE 5100*[26] |  |  |  |  |  |  |
| Aniline |  |  |  |  |  |  |
| Pyridine |  | 10 |  |  |  |  |
| Tetramethylthiourea |  |  |  |  |  |  |
| Polymerizable monomer |  |  |  |  |  |  |
| 4-vinylpyridine |  | 23 |  |  |  | 23 |
| Acrylamide |  |  |  |  |  |  |
| N-vinylpyrrolidone | 4 |  | 4 |  | 4 |  |
| Vulcanization accelerator |  |  |  |  |  |  |
| Diphenylguanidine |  |  |  |  |  |  |
| 2-methylimidazole |  |  |  |  |  |  |
| Component C or F |  |  |  |  |  |  |
| KAYARAD THE-330*[17] |  |  |  |  |  |  |
| KAYARAD TPA-320*[18] | 12 | 6 | 12 | 6 | 12 | 6 |
| KAYARAD TPA-330*[19] | 6 |  | 6 |  | 6 |  |
| BEAMSET 710*[20] |  |  |  |  |  |  |
| BEAMSET 700*[21] |  |  |  |  |  |  |
| Epoxy compound |  |  |  |  |  |  |
| ENA*[6] | 6 |  | 6 |  | 8 |  |
| High-molecular filler |  |  |  |  |  |  |
| HYCAR ATBN*[5] 1300 × 16 |  |  |  |  |  |  |
| ISOBAN 10*[7] |  |  |  |  |  |  |
| VIRON 300*[27] |  |  |  |  |  |  |
| Inorganic filler |  |  |  |  |  |  |
| NANOMER PGW*[22] |  |  |  |  |  |  |
| Photoinitiator |  |  |  |  |  |  |
| KAYACURE DETX-S*[23] | 2 | 3 | 2 | 3 | 0 | 3 |
| KAYACURE DMBI*[24] |  |  |  |  |  |  |
| Adherend | Polyester film | | Polyester film | | Polyester film | |
| Radiation conditions |  |  |  |  |  |  |
| UV exposure (mJ/cm$^2$) | 0 | 0 | 0 | 0 | 0 | 0 |
| UV exposure time (s) | 0 | 0 | 0 | 0 | 0 | 0 |
| EB exposure (MRad) | 40 | 7 | 40 | 7 | 20 | 0 |
| Results of film peel test |  |  |  |  |  |  |
| Peel strength (N/25 mm) |  | 9 |  | 13 |  | 86 |
| Rubber adhesion |  | E |  | E |  | D |
| Results of cord tensile test |  |  |  |  |  |  |
| Cord tension (N/cord) |  | — |  | — |  | — |
| Rubber adhesion |  | — |  | — |  | — |
| Results of differential scanning calorimetry |  |  |  |  |  |  |
| Heat-of-reaction peak temp. (° C.) |  | — |  | — |  | 142 |
| Analysis by scanning electron microscope-X-ray analyzer |  |  |  |  |  |  |
| Sulfur content in adhesive composition layer |  | — |  | — |  | Higher than rubber layer |

TABLE 1-16

| | Ex. 35 | | Ex. 36 | | Com. Ex. 12 | |
|---|---|---|---|---|---|---|
| | Undercoat layer | Adhesive layer | Undercoat layer | Adhesive layer | Undercoat layer | Adhesive layer |
| Component A | | | | | | |
| RIACRYL 3801*[1] | | | | | | |
| RIACRYL 3500*[2] | | | | | | |
| RIACRYL 3100*[3] | 10 | 54 | 10 | 54 | 10 | |
| BAC45*[4] | | | | | | |
| Component D | | | | | | |
| Monofunctional compound | | | | | | |
| SR-285*[8] | | | | | | |
| SR-440*[9] | 10 | | 10 | | 10 | 54 |
| AMP-60G*[10] | | | | | | |
| Styrene | | | | | | |
| Polyfunctional compound | | | | | | |
| 9PG*[11] | | | | | | |
| APG-400*[12] | 14 | 14 | 14 | 14 | 14 | 14 |
| Component E | | | | | | |
| SR-348*[13] | | | | | | |
| KAYARAD R551*[14] | 18 | | 18 | | 18 | |
| BEAMSET 750*[15] | | | | | | |
| KAYARAD R-712*[16] | 18 | | 18 | | 18 | |
| Component B | | | | | | |
| Amine compound | | | | | | |
| Dibutylamine | | | | 10 | | |
| Ethylenediamine | | | | | | |
| TOMIDE 252*[25] | | | | | | |
| FUJICURE 5100*[26] | | | | | | |
| Aniline | | | | | | |
| Pyridine | | | | | | |
| Tetramethylthiourea | | | | | | |
| Polymerizable monomer | | | | | | |
| 4-vinylpyridine | | | | 13 | | 23 |
| Acrylamide | | | | | | |
| N-vinylpyrrolidone | 4 | | 4 | | 4 | |
| Vulcanization accelerator | | | | | | |
| Diphenylguanidine | | | | | | |
| 2-methylimidazole | | 23 | | | | |
| Component C or F | | | | | | |
| KAYARAD THE-330*[17] | | | | | | |
| KAYARAD TPA-320*[18] | 12 | 6 | 12 | 6 | 12 | 6 |
| KAYARAD TPA-330*[19] | 6 | | 6 | | 6 | |
| BEAMSET 710*[20] | | | | | | |
| BEAMSET 700*[21] | | | | | | |
| Epoxy compound | | | | | | |
| ENA*[6] | 6 | | 6 | | 6 | |
| High-molecular filler | | | | | | |
| HYCAR ATBN*[5] 1300 × 16 | | | | | | |
| ISOBAN 10*[7] | | | | | | |
| VIRON 300*[27] | | | | | | |
| Inorganic filler | | | | | | |
| NANOMER PGW*[22] | | | | | | |
| Photoinitiator | | | | | | |
| KAYACURE DETX-S*[23] | 2 | 3 | 2 | 3 | 2 | 3 |
| KAYACURE DMBI*[24] | | | | | | |
| Adherend | Polyester film | | Polyester film | | Polyester film | |
| Radiation conditions | | | | | | |
| UV exposure (mJ/cm$^2$) | 1000 | 0 | 1000 | 0 | 1000 | 0 |
| UV exposure time (s) | 10 | 0 | 10 | 0 | 10 | 0 |
| EB exposure (MRad) | 0 | 0 | 0 | 0 | 40 | 0 |
| Results of film peel test | | | | | | |
| Peel strength (N/25 mm) | 189 | | 175 | | 16 | |
| Rubber adhesion | B | | B | | E | |

TABLE 1-16-continued

|  | Ex. 35 | | Ex. 36 | | Com. Ex. 12 | |
| --- | --- | --- | --- | --- | --- | --- |
|  | Undercoat layer | Adhesive layer | Undercoat layer | Adhesive layer | Undercoat layer | Adhesive layer |
| Results of cord tensile test |  |  |  |  |  |  |
| Cord tension (N/cord) | — |  | — |  | — |  |
| Rubber adhesion | — |  | — |  | — |  |
| Results of differential scanning calorimetry |  |  |  |  |  |  |
| Heat-of-reaction peak temp. (° C.) | — |  | — |  | — |  |
| Analysis by scanning electron microscope-X-ray analyzer |  |  |  |  |  |  |
| Sulfur content in adhesive composition layer | — |  | — |  | — |  |

TABLE 1-17

|  | Com. Ex. 13 | | Com. Ex. 14 | | Ex. 37 | |
| --- | --- | --- | --- | --- | --- | --- |
|  | Undercoat layer | Adhesive layer | Undercoat layer | Adhesive layer | Undercoat layer | Adhesive layer |
| Component A |  |  |  |  |  |  |
| RIACRYL 3801*[1] |  |  |  |  |  |  |
| RIACRYL 3500*[2] |  |  |  |  |  |  |
| RIACRYL 3100*[3] | 10 | 54 | 5 | 55 | 5 | 55 |
| BAC45*[4] |  |  |  |  |  |  |
| Component D |  |  |  |  |  |  |
| Monofunctional compound |  |  |  |  |  |  |
| SR-285*[8] |  |  |  |  |  |  |
| SR-440*[9] | 10 | 23 |  |  |  |  |
| AMP-60G*[10] |  |  | 9 |  | 9 |  |
| Styrene |  |  |  | 17 |  |  |
| Polyfunctional compound |  |  |  |  |  |  |
| 9PG*[11] |  |  |  |  |  |  |
| APG-400*[12] | 14 | 14 | 9 | 18 | 9 | 18 |
| Component E |  |  |  |  |  |  |
| SR-348*[13] |  |  |  |  |  |  |
| KAYARAD R551*[14] | 18 |  |  |  |  |  |
| BEAMSET 750*[15] |  |  |  |  |  |  |
| KAYARAD R-712*[16] | 18 |  | 20 |  | 20 |  |
| Component B |  |  |  |  |  |  |
| Amine compound |  |  |  |  |  |  |
| Dibutylamine |  |  |  |  |  |  |
| Ethylenediamine |  |  |  |  |  |  |
| TOMIDE 252*[25] |  |  |  |  |  |  |
| FUJICURE 5100*[26] |  |  |  |  |  |  |
| Aniline |  |  |  |  |  |  |
| Pyridine |  |  |  |  |  |  |
| Tetramethylthiourea |  |  |  |  |  |  |
| Polymerizable monomer |  |  |  |  |  |  |
| 4-vinylpyridine |  |  |  |  |  | 17 |
| Acrylamide |  |  |  | 6 |  | 6 |
| N-vinylpyrrolidone | 4 |  |  |  |  |  |
| Vulcanization accelerator |  |  |  |  |  |  |
| Diphenylguanidine |  |  |  |  |  |  |
| 2-methylimidazole |  |  |  |  |  |  |
| Component C or F |  |  |  |  |  |  |
| KAYARAD THE-330*[17] |  |  | 15 | 7 | 15 | 7 |
| KAYARAD TPA-320*[18] | 12 | 6 |  |  |  |  |

TABLE 1-17-continued

|  | Com. Ex. 13 | | Com. Ex. 14 | | Ex. 37 | |
| --- | --- | --- | --- | --- | --- | --- |
|  | Undercoat layer | Adhesive layer | Undercoat layer | Adhesive layer | Undercoat layer | Adhesive layer |
| KAYARAD TPA-330*[19] |  | 6 |  |  |  |  |
| BEAMSET 710*[20] |  |  |  |  |  |  |
| BEAMSET 700*[21] |  |  |  |  |  |  |
| Epoxy compound |  |  |  |  |  |  |
| ENA*[6] |  | 6 |  | 20 |  | 20 |
| High-molecular filler |  |  |  |  |  |  |
| HYCAR ATBN*[5] 1300 × 16 |  |  |  | 6 |  | 6 |
| ISOBAN 10*[7] |  |  |  | 7 |  | 7 |
| VIRON 300*[27] |  |  |  |  |  |  |
| Inorganic filler |  |  |  |  |  |  |
| NANOMER PGW*[22] |  |  |  |  |  |  |
| Photoinitiator |  |  |  |  |  |  |
| KAYACURE DETX-S*[23] | 2 | 3 | 3 | 3 | 3 | 3 |
| KAYACURE DMBI*[24] |  |  |  |  |  |  |
| Adherend | Polyester film | | Polyester cord | | Polyester cord | |
| Radiation conditions |  |  |  |  |  |  |
| UV exposure (mJ/cm$^2$) | 1000 | 0 | 1000 | 1000 | 1000 | 1000 |
| UV exposure time (s) | 10 | 0 | 10 | 10 | 10 | 10 |
| EB exposure (MRad) | 40 | 0 | 0 | 0 | 0 | 0 |
| Results of film peel test |  |  |  |  |  |  |
| Peel strength (N/25 mm) |  | 11 |  | — |  | — |
| Rubber adhesion |  | E |  | — |  | — |
| Results of cord tensile test |  |  |  |  |  |  |
| Cord tension (N/cord) |  | — |  | 4 |  | 22 |
| Rubber adhesion |  | — |  | E |  | A |
| Results of differential scanning calorimetry |  |  |  |  |  |  |
| Heat-of-reaction peak temp. (° C.) |  |  | — |  | — |  |
| Analysis by scanning electron microscope-X-ray analyzer |  |  |  |  |  |  |
| Sulfur content in adhesive composition layer |  |  | — |  | — |  |

TABLE 1-18

|  | Ex. 38 | | Ex. 39 | | Ex. 40 | |
| --- | --- | --- | --- | --- | --- | --- |
|  | Undercoat layer | Adhesive layer | Undercoat layer | Adhesive layer | Undercoat layer | Adhesive layer |
| Component A |  |  |  |  |  |  |
| RIACRYL 3801*[1] |  |  |  |  | 6 | 50 |
| RIACRYL 3500*[2] | 6 | 50 |  |  |  |  |
| RIACRYL 3100*[3] |  |  | 6 | 56 |  |  |
| BAC45*[4] |  |  |  |  |  |  |
| Component D |  |  |  |  |  |  |
| Monofunctional compound |  |  |  |  |  |  |
| SR-285*[8] | 8 |  |  |  | 10 |  |
| SR-440*[9] |  |  | 10 | 8 |  |  |
| AMP-60G*[10] | 5 | 15 |  |  |  | 10 |
| Styrene |  |  |  |  | 6 |  |
| Polyfunctional compound |  |  |  |  |  |  |
| 9PG*[11] | 12 |  |  |  | 14 |  |
| APG-400*[12] |  | 20 | 10 | 10 |  | 20 |

TABLE 1-18-continued

| | Ex. 38 | | Ex. 39 | | Ex. 40 | |
|---|---|---|---|---|---|---|
| | Undercoat layer | Adhesive layer | Undercoat layer | Adhesive layer | Undercoat layer | Adhesive layer |
| Component E | | | | | | |
| SR-348*[13] | 32 | | | | | |
| KAYARAD R551*[14] | | | 20 | | | |
| BEAMSET 750*[15] | | | | | | |
| KAYARAD R-712*[16] | | | | | 30 | |
| Component B | | | | | | |
| Amine compound | | | | | | |
| Dibutylamine | | | | | | |
| Ethylenediamine | | | | | | |
| TOMIDE 252*[25] | | | | | | |
| FUJICURE 5100*[26] | | | 10 | | | |
| Aniline | | | | | | |
| Pyridine | | 5 | | 15 | | |
| Tetramethylthiourea | | | | | | |
| Polymerizable monomer | | | | | | |
| 4-vinylpyridine | | | | | | |
| Acrylamide | | | | | | |
| N-vinylpyrrolidone | | | 9 | | | 10 |
| Vulcanization accelerator | | | | | | |
| Diphenylguanidine | | | | | | |
| 2-methylimidazole | | | | | | |
| Component C or F | | | | | | |
| KAYARAD THE-330*[17] | | | | | | 8 |
| KAYARAD TPA-320*[18] | | | | | | |
| KAYARAD TPA-330*[19] | 20 | 7 | | | | |
| BEAMSET 710*[20] | | | | | 15 | |
| BEAMSET 700*[21] | | | 10 | 8 | | |
| Epoxy compound | | | | | | |
| ENA*[8] | | | 20 | | | |
| High-molecular filler | | | | | | |
| HYCAR ATBN*[5] 1300 × 16 | | | | | | |
| ISOBAN 10*[7] | | | | | 5 | |
| VIRON 300*[27] | 14 | | | | 10 | |
| Inorganic filler | | | | | | |
| NANOMER PGW*[22] | | | 2 | | 2 | |
| Photoinitiator | | | | | | |
| KAYACURE DETX-S*[23] | 3 | 3 | | | 2 | 2 |
| KAYACURE DMBI*[24] | | | 3 | 3 | | |
| Adherend | Polyester cord | | Polyester cord | | Polyester cord | |
| Radiation conditions | | | | | | |
| UV exposure (mJ/cm$^2$) | 1000 | 1000 | 1000 | 1000 | 1000 | 1000 |
| UV exposure time (s) | 10 | 10 | 10 | 10 | 10 | 10 |
| EB exposure (MRad) | 0 | 0 | 0 | 0 | 0 | 0 |
| Results of film peel test | | | | | | |
| Peel strength (N/25 mm) | — | | — | | — | |
| Rubber adhesion | — | | — | | — | |
| Results of cord tensile test | | | | | | |
| Cord tension (N per cord) | 15 | | 20 | | 19 | |
| Rubber adhesion | B | | A | | B | |
| Results of differential scanning calorimetry | | | | | | |
| Heat-of-reaction peak temp. (° C.) | — | | — | | — | |
| Analysis by scanning electron microscope-X-ray analyzer | | | | | | |
| Sulfur content in adhesive composition layer | — | | — | | — | |

TABLE 1-19

|  | Ex. 41 | | Ex. 42 | | Ex. 43 | |
| --- | --- | --- | --- | --- | --- | --- |
|  | Undercoat layer | Adhesive layer | Undercoat layer | Adhesive layer | Undercoat layer | Adhesive layer |
| Component A |  |  |  |  |  |  |
| RIACRYL 3801[*1] |  |  |  |  |  |  |
| RIACRYL 3500[*2] |  |  |  |  |  |  |
| RIACRYL 3100[*3] |  |  | 6 | 56 | 6 | 56 |
| BAC45[*4] | 5 | 50 |  |  |  |  |
| Component D |  |  |  |  |  |  |
| Monofunctional compound |  |  |  |  |  |  |
| SR-285[*8] | 10 |  |  |  |  |  |
| SR-440[*9] |  |  |  |  |  |  |
| AMP-60G[*10] |  | 15 | 15 | 8 | 15 | 8 |
| Styrene |  |  |  |  |  |  |
| Polyfunctional compound |  |  |  |  |  |  |
| 9PG[*11] |  |  |  |  |  |  |
| APG-400[*13] | 10 | 15 | 15 | 10 | 15 | 10 |
| Component E |  |  |  |  |  |  |
| SR-348[*13] | 32 |  |  |  |  |  |
| KAYARAD R551[*14] |  |  | 20 |  | 20 |  |
| BEAMSET 750[*15] |  |  |  |  |  |  |
| KAYARAD R-712[*16] |  |  |  |  |  |  |
| Component B |  |  |  |  |  |  |
| Amine compound |  |  |  |  |  |  |
| Dibutylamine |  |  |  |  |  |  |
| Ethylenediamine |  |  |  |  |  |  |
| TOMIDE 252[*25] | 10 |  | 10 |  | 10 |  |
| FUJICURE 5100[*26] |  |  |  |  |  |  |
| Aniline |  |  |  |  |  |  |
| Pyridine |  | 10 |  |  |  |  |
| Tetramethylthiourea |  |  |  |  |  |  |
| Polymerizable monomer |  |  |  |  |  |  |
| 4-vinylpyridine |  |  |  | 16 |  | 16 |
| Acrylamide |  |  |  |  |  |  |
| N-vinylpyrrolidone |  |  |  |  |  |  |
| Vulcanization accelerator |  |  |  |  |  |  |
| Diphenylguanidine |  |  |  |  |  |  |
| 2-methylimidazole |  |  |  |  |  |  |
| Component C or F |  |  |  |  |  |  |
| KAYARAD THE-330[*17] | 20 | 7 |  |  |  |  |
| KAYARAD TPA-320[*18] |  |  |  |  |  |  |
| KAYARAD TPA-330[*19] |  |  |  |  |  |  |
| BEAMSET 710[*20] |  |  |  |  |  |  |
| BEAMSET 700[*21] |  |  | 12 | 8 | 12 | 8 |
| Epoxy compound |  |  |  |  |  |  |
| ENA[*6] | 10 |  | 20 |  | 20 |  |
| High-molecular filler |  |  |  |  |  |  |
| HYCAR ATBN[*5] 1300 × 16 |  |  |  |  |  |  |
| ISOBAN 10[*7] |  |  |  |  |  |  |
| VIRON 300[*27] |  |  |  |  |  |  |
| Inorganic filler |  |  |  |  |  |  |
| NANOMER PGW[*22] |  |  |  |  |  |  |
| Photoinitiator |  |  |  |  |  |  |
| KAYACURE DETX-S[*23] | 3 | 3 |  |  |  |  |
| KAYACURE DMBI[*24] |  |  | 2 | 2 | 2 | 2 |
| Adherend | Polyester cord | | Polyester cord | | Nylon cord | |
| Radiation conditions |  |  |  |  |  |  |
| UV exposure (mJ/cm$^2$) | 1000 | 1000 | 1000 | 1000 | 0 | 1000 |
| UV exposure time (s) | 10 | 10 | 10 | 10 | 0 | 10 |
| EB exposure (MRad) | 0 | 0 | 0 | 0 | 40 | 0 |
| Results of film peel test |  |  |  |  |  |  |
| Peel strength (N/25 mm) | — | | — | | — | |
| Rubber adhesion | — | | — | | — | |

TABLE 1-19-continued

| | Ex. 41 | | Ex. 42 | | Ex. 43 | |
|---|---|---|---|---|---|---|
| | Undercoat layer | Adhesive layer | Undercoat layer | Adhesive layer | Undercoat layer | Adhesive layer |
| Results of cord tensile test | | | | | | |
| Cord tension (N/cord) | | 16 | | 22 | | 24 |
| Rubber adhesion | | B | | A | | A |
| Results of differential scanning calorimetry | | | | | | |
| Heat-of-reaction peak temp. (° C.) | — | | — | | — | |
| Analysis by scanning electron microscope-X-ray analyzer | | | | | | |
| Sulfur content in adhesive composition layer | | — | | — | | — |

Component A
*1 to *3Methacrylate-grafted polybutadiene
*4Methacrylate-terminated polybutadiene
Component D
Monofunctional compound
*8Tetrahydrofuryl monoacrylate
*9Isooctyl acrylate
*10Phenoxypolyethylene glycol monoacrylate
Polyfunctional compound
*11Polypropylene glycol dimethacrylate
*12Polypropylene glycol diacrylate
Component E
*13Ethoxylated bisphenol A dimethacrylate
*14Ethoxylated bisphenol A diacrylate
*15Ethoxylated bisphenol A diacrylate
*16Ethoxylated bisphenol F diacrylate
Component B
*25Aliphatic polyamine
*26Modified aliphatic polyamine
Component C or F
*17Pentaerythritol polyethoxyacrylate
*18 and *19Pentaerythritol polypropoxyacrylate
*20Pentaerythritol polyacrylate
*21dipentaerythritol polyacrylate
Epoxy compound
*6Epoxy novolak acrylate
High-molecular filler
*5Amine-modified acrylonitrile butadiene copolymer
*7Copolymer of isobutylene and maleic anhydride
*27Thermoplastic high-molecular polyester resin
Inorganic filler
*22Montmorillonite clay
Photoinitiator
*232,4-diethylthioxanthone
*24Isoamyl p-dimethylaminobenzoate

INDUSTRIAL APPLICABILITY

In the process of bonding a rubber to an adherend through the adhesive composition according to the present invention, the adhesive composition is irradiated with ultraviolet light or radiation and then the vulcanization is preformed while bringing an unvulcanized rubber into press-contact with the adhesive composition, thereby achieving an excellent adhesion between the rubber and the adherend. Accordingly, the present invention is useful for the production of a rubber-reinforcing material or a rubber article which require a good adhesion between the rubber and the adherend.

What is claimed is:

1. An ultraviolet- or radiation-curable adhesive composition comprising (A) a conjugated diene polymer having a weight-average molecular weight of 500 to 100,000, (C) a compound having in its molecule three or more functional groups selected from the group consisting of an acryloyloxy group, a methacryloyloxy group and groups represented by the following formula I:

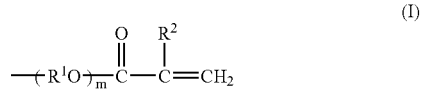

wherein $R^1$ is a $C_2$-$C_5$ alkylene group; $R^2$ is hydrogen or a $C_1$-$C_2$ alkyl group; and m is an integer of 0 to 5, and (D) a compound having in its molecule one or two groups selected from the group consisting of an acryloyloxy group and a methacryloyloxy group, wherein the compound C is contained in an amount of 30 to 80 parts by weight and the compound D is contained in an amount of 3 to 60 parts by weight, each based on 100 parts by weight of the conjugated diene polymer A.

2. The ultraviolet- or radiation-curable adhesive composition according to claim 1, wherein an end group of the conjugated diene polymer A is selected from the group consisting of a vinyl group, an acryloyl group, a methacryloyl group, an acryloyloxy group, a methacryloyloxy group and an allyl group.

3. The ultraviolet- or radiation-curable adhesive composition according to claim 1, wherein an end group of the conjugated diene polymer A is an acryloyloxy group or a methacryloyloxy group.

4. The ultraviolet- or radiation-curing adhesive composition according to claim 1, further comprising at least one additive selected from the group consisting of epoxy compounds, inorganic fillers, high-molecular fillers and basic compounds.

5. A method for bonding rubber to an adherend, comprising:
coating at least a part of a surface of the adherend with the adhesive composition as set forth in claim 1 to form an adhesive layer;
optionally irradiating the adhesive layer with ultraviolet light or radiation; and
vulcanizing an unvulcanized rubber while bringing the unvulcanized rubber into press-contact with the adhesive layer, thereby bonding the rubber to the adherend through the adhesive composition.

6. The method according to claim 5, wherein the vulcanization is performed after irradiating the adhesive layer with ultraviolet light or radiation.

7. The method according to claim 6, wherein the radiation is electron beam or gamma ray.

8. The method according to claim 5, wherein the adherend is made of a plastic material.

9. The method according to claim 8, wherein the plastic material is selected from the group consisting of films, fibers, non-woven fabrics, monofilament cords, multifilament cords and resin molded articles.

10. The method according to claim 5, wherein the rubber is a diene rubber.

11. The method according to claim 5, wherein a vulcanizing agent for the rubber is sulfur.

12. The method according to claim 5, wherein the adhesive layer is formed on an undercoat layer which is formed in advance on at least a part of the surface of the adherend.

13. The method according to claim 12, wherein the adhesive layer is formed after irradiating the undercoat layer with ultraviolet light or radiation.

14. The method according to claim 12, wherein the undercoat layer is made of an undercoat composition comprising (E) a compound having a bisphenol backbone represented by the following formula II:

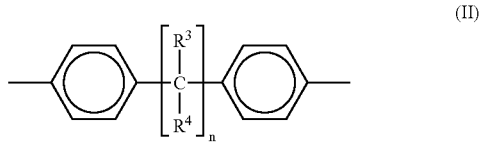

wherein $R^3$ and $R^4$ are each independently hydrogen or a $C_1$-$C_3$ alkyl group; and n is an integer of 1 to 3, and (F) a compound having in its molecule three or more acryloyloxy group and/or methacryloyloxy group.

15. The method according to claim 14, wherein the undercoat composition contains at least one additive selected from the group consisting of epoxy compounds, inorganic fillers, high-molecular fillers and basic compounds.

16. A rubber-reinforcing material produced by the method as set forth in claim 5.

17. A rubber article produced using the rubber-reinforcing material as set forth in claim 16.

18. A tire produced using the rubber-reinforcing material as set forth in claim 16.

* * * * *